(12) United States Patent
Maeno et al.

(10) Patent No.: US 7,584,945 B2
(45) Date of Patent: Sep. 8, 2009

(54) VIBRATION DAMPING DEVICE

(75) Inventors: Hajime Maeno, Kasugai (JP); Mutsumi Muraoka, Nagakute-tyou (JP)

(73) Assignee: Tokai Rubber Industries, Ltd., Komaki (JP)

( * ) Notice: Subject to any disclaimer, the term of this patent is extended or adjusted under 35 U.S.C. 154(b) by 562 days.

(21) Appl. No.: 11/488,659

(22) Filed: Jul. 19, 2006

(65) Prior Publication Data

US 2007/0018366 A1    Jan. 25, 2007

(30) Foreign Application Priority Data

Jul. 21, 2005   (JP)   ............... 2005-211000
Jun. 20, 2006   (JP)   ............... 2006-170530

(51) Int. Cl.
   *F16F 5/00*   (2006.01)
(52) U.S. Cl. .................. 267/140.13; 267/292
(58) Field of Classification Search ............ 267/140.11, 267/140.13, 141, 292
   See application file for complete search history.

(56) References Cited

U.S. PATENT DOCUMENTS

| | | | |
|---|---|---|---|
| 4,842,258 A | 6/1989 | Misaka et al. | |
| 5,183,243 A | 2/1993 | Matsumoto | |
| 5,775,666 A | 7/1998 | Tsukamoto et al. | |
| 6,352,248 B1 | 3/2002 | Hamaekers et al. | |
| 6,517,061 B2 | 2/2003 | Yamamoto et al. | |
| 6,588,737 B2 | 7/2003 | Goto et al. | |
| 6,631,894 B2 | 10/2003 | Takashima et al. | |
| 6,659,436 B2 | 12/2003 | Muramatsu et al. | |
| 6,953,187 B2 * | 10/2005 | Groth et al. | 267/141 |
| 2003/0075848 A1 | 4/2003 | Okanaka et al. | |
| 2004/0262830 A1 | 12/2004 | Maeno et al. | |
| 2004/0262831 A1 | 12/2004 | Maeno et al. | |

FOREIGN PATENT DOCUMENTS

| | | | |
|---|---|---|---|
| JP | 06129476 A | * | 5/1994 |
| JP | 06207637 A | * | 7/1994 |
| JP | 07190135 A | * | 7/1995 |
| JP | B2-3362575 | | 10/2002 |
| JP | A-2005-23973 | | 1/2005 |
| JP | A-2005-69286 | | 3/2005 |

* cited by examiner

*Primary Examiner*—Xuan Lan Nguyen
(74) *Attorney, Agent, or Firm*—Oliff & Berridge, PLC

(57) ABSTRACT

A vibration damping device including a first and a second mounting member connected together by an elastic body, comprising a rebound abutting portion of flange shape integrally formed on the first mounting member; a tubular bracket fastened about the second mounting member; a stopper abutting portion formed at the tubular bracket; and a cushioning rubber disposed on the rebound abutting portion to constitute a rebound stopper mechanism for limiting relative displacement in an axially away direction between the first and second mounting members, wherein a first rotation preventing mechanism for preventing rotation of the first mounting member about a center axis of the tubular bracket by means of abutting contact of a pair of first abutting faces formed on the cushioning rubber against a pair of first abutted faces formed on a mating tube portion of the tubular bracket.

13 Claims, 13 Drawing Sheets

VIBRATION DAMPING DEVICE

INCORPORATED BY REFERENCE

The disclosure of Japanese Patent Application No. 2005-211000 filed on Jul. 21, 2005, and No. 2006-170530 filed on Jun. 20, 2006, each including the specification, drawings and abstract is incorporated herein by reference in its entirety.

BACKGROUND OF THE INVENTION

1. Field of the Invention

The present invention relates generally to a vibration damping device for installation between components to be linked in a vibration damping manner, and relates in particular to the vibration damping device having a first mounting member disposed spaced apart in the axial direction from a main rubber elastic body, and comprising a stopper mechanism for limiting relative displacement of the first mounting member and the main rubber elastic body when excessive load is input.

2. Description of the Related Art

Vibration damping devices of a design wherein a main rubber elastic body is disposed between a first mounting member and a second mounting member attached respectively to components to be linked in a vibration damping manner, are utilized in a wide range of fields. Japanese Patent No. 3362575 discloses, for example, one type of known vibration damping devices, wherein a first mounting member and a second mounting member are elastically coupled by means of a main rubber elastic body.

In some instances, a vibration damping device of this kind includes a rebound stopper for limiting relative displacement of the first mounting member and the second mounting member in direction of moving apart in the axial direction, in order to prevent excessive elastic deformation of the main rubber elastic body. However, even where a rebound stopper has been provided, there are still instances in which, owing to the size of the input load or the like, it is difficult to adequately limit relative displacement of the first mounting member and the second mounting member. In such instances, the main rubber elastic body may be forced to undergo excessive deformation, posing the risk of diminished durability of the main rubber elastic body.

Accordingly, JP-A-2005-23973 proposes a vibration damping device wherein the first mounting member is superimposed in the axial direction on the small diameter end face of a main rubber elastic body of generally frustoconical shape, and the second mounting member is affixed to the outer circumferential face of the large diameter end face of a main rubber elastic body, while a stopper mechanism is provided for a cushion-wise limitation of relative displacement of the first mounting member and the second mounting member in the direction of moving apart (rebound direction).

With this kind of vibration damping device, the first mounting member is superimposed in an unattached state against the main rubber elastic body and movable apart therefrom. In the event of an input load acting in the direction that causes the first mounting member to undergo relative displacement away from the main rubber elastic body in the axial direction, the first mounting member will undergo relative displacement away from the main rubber elastic body so that creation of tensile stress in the main rubber elastic body can be reduced or avoided altogether. Thus, improved durability of the main rubber elastic body is advantageously attained.

However, the inventors have found that a vibration damping device constructed in this way produces a new problem. The problem is caused by relative rotation of the first mounting member and a tubular bracket, for example. Specifically, where the vibration damping device is employed as an automotive engine mount, the first mounting member and the tubular bracket are fastened respectively by means of bolts or the like to a component on the power unit side and a component on the vehicle body side. At this time, the first mounting member and the tubular bracket are mounted while being positioned respectively with a specific orientation in the circumferential direction with respect to the components to be coupled in a vibration damping manner. However, with the structure of the vibration damping device taught in the aforementioned JP-A-2005-23973, the first mounting member and the main rubber elastic body furnished with the second mounting member fixedly mounted to the tubular bracket are formed independently of one another, and assembled in an unattached state so as to be movable apart from one another. This arrangement poses a risk that the first mounting member will undergo rotation relative to the tubular bracket during shipping or storage. Consequently, an operation to align the first mounting member and the tubular bracket in the circumferential direction with respect to the components to be linked becomes necessary before the first mounting member and the tubular bracket can be fastened to the components, resulting in insufficient ease of mount, and a risk of lower productivity of products (e.g. automotive vehicles etc.) in which the vibration damping device is installed.

In particular, where the mounting member is anisotropic due to the fact that the spring properties required thereof in the vehicle front-to-back direction differ from those required in the vehicle side-to-side direction, it will be necessary for the main rubber elastic body and the first mounting member to be aligned in the circumferential direction. However, with the vibration damping device structure taught in JP-A-2005-23973, wherein the main rubber elastic body and the first mounting member are capable of relative rotation, it is difficult to keep the main rubber elastic body and the first mounting member in the positioned state in the circumferential direction.

With the aim of preventing such rotation, there is proposed a method of disposing the axial distal end of a cushioning rubber so that it presses against the outer bracket in order to inhibit rotation. However, if the vibration damping device is subjected to outside force during shipping or the like such that the compressive force applied to the cushioning rubber becomes released, there is a risk first mounting member and the tubular bracket will be able to rotate relative to one another. Thus, it was difficult to consistently prevent relative rotation of the first mounting member and the tubular bracket by means of the cushioning rubber pressing against the tubular bracket in the axial direction.

SUMMARY OF THE INVENTION

It is therefore one object of the present invention to provide a vibration damping device of improved construction, which affords outstanding load bearing capability while enabling the first mounting member and the tubular bracket to be readily placed in position and mounted onto components for vibration damping.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the present invention provides a vibration damping device for connecting two components in a vibration damping fashion, comprising: a main rubber elastic body of generally frustoconical shape overall; a first mounting member adapted to be fixed to one of the two components, and being of independent separate structure from the main rubber body, and being superimposed on a small diameter end face of the main rubber elastic body while being movable away therefrom; a second mounting member adapted to be fixed to an other one of the two components, and being fixed to an outer circumferential face of a large diameter end of the main rubber elastic body; a rebound abutting portion of flange shape integrally formed on an outside peripheral portion of the first mounting member; a tubular bracket fastened fitting externally about the second mounting member and axially extending toward the first mounting member so as to provide a tubular wall portion providing a mating tube portion at an axial distal end portion thereof; a stopper abutting portion formed at an axial distal end of the tubular bracket and extending inwardly in an axis perpendicular direction, the stopper abutting portion being situated facing and spaced apart axially outward with respect to the rebound abutting portion; a cushioning rubber disposed on the rebound abutting portion so as to constitute a rebound stopper mechanism for limiting relative displacement in a moving away direction in an axial direction between the first mounting member and the second mounting member on the basis of cushion-wise abutment of the rebound abutting portion and the stopper abutting portion via the cushioning rubber; a pair of first abutting faces for positioning purposes, being formed at portions situated to either side in a first axis perpendicular direction of an outer circumferential face of the cushioning rubber, in a diametrically opposed arrangement extending parallel to each other in a circumferential direction; a pair of first abutted faces for positioning purposes, being formed at portions situated to either side in the first axis perpendicular direction of an inner circumferential face of the mating tube portion in a diametrically opposed arrangement extending parallel to each other in a circumferential direction, wherein with the pair of first abutting faces of the cushioning rubber aligned in the circumferential direction with respect to the pair of first abutted faces of the mating tube portion, the cushioning rubber is housed within the tubular bracket, with an axial distal end face of the cushioning rubber being pushed in the axial direction against the rebound abutting portion on the basis of the elasticity of the main rubber elastic body, and wherein a first rotation preventing mechanism for preventing rotation of the first mounting member about a center axis of the tubular bracket by means of abutting contact of the pair of first abutting faces of the cushioning rubber against the pair of first abutted faces of the mating tube portion.

In the vibration damping device of construction according to this mode, there is furnished a first rotation preventing mechanism for preventing relative rotation of the first mounting member which is attached to one component to be coupled in a vibration damped manner, and the second mounting member which is attached to the other component to be coupled in a vibration damped manner. Therefore, during the process of being mounted on the components to be coupled in a vibration damped manner, the first mounting member and the tubular bracket can be mounted easily, without having to be aligned in the circumferential direction. Accordingly, handling during shipping and storage is easy, and the procedure for mounting the device on components to be coupled in a vibration damped manner can be carried out easily, so that improved productivity can be attained.

Additionally, since it is possible to produce the first rotation preventing mechanism by housing the cushioning rubber within the tubular bracket with the abutting faces of the cushioning rubber and the abutted faces of the tubular bracket aligned in the circumferential direction, the parts which make up the rebound stopper mechanism can be utilized cleverly to obviate the need for special parts or components, and the first rotation preventing mechanism can be furnished easily by means of simple construction.

A second mode of the present invention provides a vibration damping device according to the first mode, wherein with the cushioning rubber housed within the tubular bracket with the abutting faces of the cushioning rubber and the abutted faces of the tubular bracket aligned in the circumferential direction, the pair of first abutting faces of the cushioning rubber are opposed to the pair of first abutted faces of the tubular bracket with a given gap therebetween, and the cushioning rubber are spaced away from the tubular bracket around an entire circumference thereof.

In the vibration damping device of construction according to this mode, a relative rotation between the first mounting member and the second mounting member creates an abutting contact between the first abutting faces of the cushioning rubber against the first abutted faces of the tubular bracket. In the initial state where the first abutting faces and the first abutted faces are aligned in the circumferential direction, the first abutting faces and the first abutted faces are spaced away from each other, thereby preventing the first abutting faces of the cushioning rubber from being pressed against the first abutted faces of the tubular bracket in the first axis perpendicular direction. Accordingly, undesirable deterioration or cracks of the cushioning rubber caused by its compression in the first axis perpendicular direction can be minimized or eliminated, while effectively preventing relative rotation between the first and second mounting members owing to the abutting contacts between the first abutting faces and the first abutted faces, thereby effectively improving durability of the cushioning rubber. Also, the size of gap between the cushioning rubber and the tubular bracket may be suitably adjusted, thereby suitably tuning the spring characteristics of the engine mount with an improved degree of freedom.

A third mode of the present invention provides a vibration damping device according to the first mode, wherein with the cushioning rubber housed within the tubular bracket with the abutting faces of the cushioning rubber and the abutted faces of the tubular bracket aligned in the circumferential direction, the pair of first abutting faces of the cushioning rubber are pressed against the pair of first abutted faces of the tubular bracket on the basis of elasticity of the main rubber elastic body in the first axis perpendicular direction.

In the vibration damping device of construction according to this mode, the first abutting faces of the cushioning rubber and the second abutted faces of the tubular bracket are pressed each other in the first axis perpendicular direction, i.e., in the juxtaposing direction. This arrangement permits effective prevention of the relative rotation between the cushioning rubber and the tubular bracket, making it possible to mount the vibration damping device to the target components in the given direction, with further improved ease and stability.

The invention in a fourth mode provides a vibration damping device according to the vibration damping device pertaining to the first mode, wherein pressure lips that project from each of the pair of abutting faces are integrally formed with the cushioning rubber in at least two circumferential end portions of each of the abutting faces; with the pressure lips being pressed in a compressed state against the pair of abutted faces.

In the vibration damping device according to this mode, by means of forming pressure lips that project in the axis perpendicular direction from the abutting faces, frictional force and the like occurring when the cushioning rubber is press into the tubular bracket can be reduced, and the insertion force required during press fitting can be minimized, affording an easy operation to attach the cushioning rubber to the tubular bracket. Additionally, since the pressure lips are placed in abutment in a compressed state against the abutted faces, a sufficient level of pushing force against the abutted faces can be obtained, and stable positioning of the first mounting member and the second mounting member in the circumferential direction can be realized.

A fifth mode of the present invention provides a vibration damping device according to claim 1, further comprising: a stopper rubber projecting in a direction of juxtaposition of the first mounting member and the main rubber elastic body, and formed on one of the first mounting member and the main rubber elastic body; a mating recess opening onto a superimposed face of the first mounting member and the main rubber elastic body, and formed on an other of the first mounting member and the main rubber elastic body; a pair of second abutting faces in a diametrically opposed arrangement extending parallel to one another in the circumferential direction, which are formed at portions situated to either side of an outer circumferential face of the stopper rubber in the first axis perpendicular direction; and a pair of second abutted faces in a diametrically opposed arrangement extending parallel to one another in the circumferential direction, which are formed at portions situated to either side of an inner circumferential face of the mating recess in the first axis perpendicular direction, wherein with the pair of second abutting faces aligned in the circumferential direction with respect to the pair of second abutted faces, the stopper rubber mates with the mating recess so as to provide a second rotation preventing mechanism for preventing rotation about the center axis of the main rubber elastic body with respect to the first mounting member.

In the vibration damping device constructed in accordance with this mode, there is furnished the second rotation preventing mechanism for preventing relative rotation of the main rubber elastic body and the first mounting member, whereby the mounting member can be positioned in the circumferential direction with respect of the first mounting member and the tubular bracket, enabling the main rubber elastic body to be readily mounted while in the prescribed orientation, during mounting of the vibration damping device to components being coupled in a vibration damped manner.

The vibration damping device constructed according to this mode is particularly useful in cases where the main rubber elastic body is anisotropic, such as where the spring properties required of it differ depending on the diametrical direction, or where a negative pressure suction port or electrical wiring is furnished to the main rubber elastic body. Specifically, since the main rubber elastic body can be positioned easily in the circumferential direction with respect to components being coupled in a vibration damping manner, even where spring properties differ depending on the direction, the main rubber elastic body can nevertheless be aligned in a specific circumferential direction. While in cases where the tubular bracket is furnished with a through hole or the like for exposing a negative pressure suction port to the outside or for passing electrical wiring through, the main rubber elastic body can nevertheless be easily positioned and secured in the circumferential direction to the tubular bracket, whereby a negative pressure suction port or electrical wiring can be easily aligned with a through hole formed in the tubular bracket.

A sixth mode of the present invention provides a vibration damping device according to the fifth mode, wherein a gap is formed between the outer circumferential face of the stopper rubber and the inner circumferential face of the mating recess.

In the vibration damping device constructed in accordance with this mode, the stopper rubber can be easily inserted into and mated with the mating recess, and the second rotation preventing mechanism can be realized in an easily manufactured manner.

The gap formed between the stopper rubber and the mating recess is made narrow enough that the stopper rubber cannot be made to rotate within the mating recess. The gap need not be formed all the way around the circumference, and may instead be formed over one section in the circumferential direction.

A seventh mode of the present invention provides a vibration damping device according to the fifth or sixth mode, wherein a projecting length dimension of the stopper rubber is greater than a depth dimension of the mating recess.

In the vibration damping device constructed in accordance with this mode, the projecting length dimension of the stopper rubber is made greater than the depth dimension of the mating recess, whereby in the event that, with the first mounting member positioned spaced apart in the axial direction from the main rubber elastic body, the first mounting member is again caused to undergo relative displacement urging it closer to the main rubber elastic body, the projecting distal end face of the stopper rubber will first come into abutment with the floor of the mounting member, and undergo compressive deformation in the axial direction. Consequently, due to the cushioning action produced by elastic deformation of the stopper rubber, the occurrence of noise caused by the first mounting member striking against the main rubber elastic body can be reduced, and improved durability of the first mounting member and the main rubber elastic body can be attained.

By forming a gap between the outside peripheral face of the stopper rubber and the inside peripheral face of the mating recess, bulging deformation in the axis perpendicular direction in association with compressive deformation of the stopper rubber in the axial direction can be accommodated by the gap.

An eighth mode of the invention provides a vibration damping device according to the seventh mode, wherein a slot is formed on a projecting distal end face of the stopper rubber, with edge portions of the slot opening onto a peripheral wall face of the stopper rubber.

In the vibration damping device constructed in accordance with this mode, bulging deformation of the stopper rubber in the axis perpendicular direction in association with compressive deformation thereof in the axial direction can be accommodated advantageously by means of the distal end slot, and cushioning action produced by compressive deformation of the stopper rubber in the axial direction can be effectively attained. Additionally, since the two edges of the distal end slot connect with the gap formed between the opposing faces of the stopper rubber and peripheral wall of the mating recess, the arrangement is not affected by an air spring produced by air within the distal end slot, and bulging deformation of the stopper rubber into the distal end slot can be accommodated effectively.

A ninth mode of the invention provides a vibration damping device according to any one of the fifth to eighth modes, wherein a peripheral wall face of at least a projecting distal end portion in the stopper rubber constitutes a tapering guide face composed of a sloping face.

In the vibration damping device constructed in accordance with this mode, the stopper rubber can be guided into the mating recess by means of a tapering guide face, so that the procedure for fitting the stopper rubber into the mating recess can be carried out easily.

A tenth mode of the invention provides a vibration damping device according to any one of the first to ninth modes, further comprising a retainer member vulcanization bonded to a small diameter end of the main rubber elastic body. In the vibration damping device constructed in accordance with this mode, it is possible to reduce a decline in durability of the main rubber elastic body resulting from the first mounting member striking against the main rubber elastic body.

An eleventh mode of the invention provides a vibration damping device according to the tenth mode, wherein the retainer member is of generally cup shape opening onto the small diameter end face of the main rubber elastic body, and a pressure receiving flange of flange form is formed extending outward in the axis perpendicular direction at a rim of a mouth of the retainer member.

In the vibration damping device constructed in accordance with this mode, the main rubber elastic body may fill the recess on the inside of the retainer member is of cup shape.

A twelfth mode provides a vibration damping device according to the fifth mode and employing the aforementioned retainer member defined in the eleventh modes, wherein the mating recess is formed by a recess on an inside of the retainer member.

A thirteenth mode according to the twelfth mode, wherein an inside face rubber layer is formed so as to cover an entire inside face of the retainer member. In the vibration damping device constructed in accordance with this mode, direct striking of the stopper rubber against the retainer member can be avoided, and durability improved.

As will be apparent from the preceding description, in vibration damping devices constructed in accordance with the present invention, ease of mounting of the first mounting member and the tubular bracket onto components to be linked in a vibration damping fashion can be attained.

BRIEF DESCRIPTION OF THE DRAWINGS

The foregoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
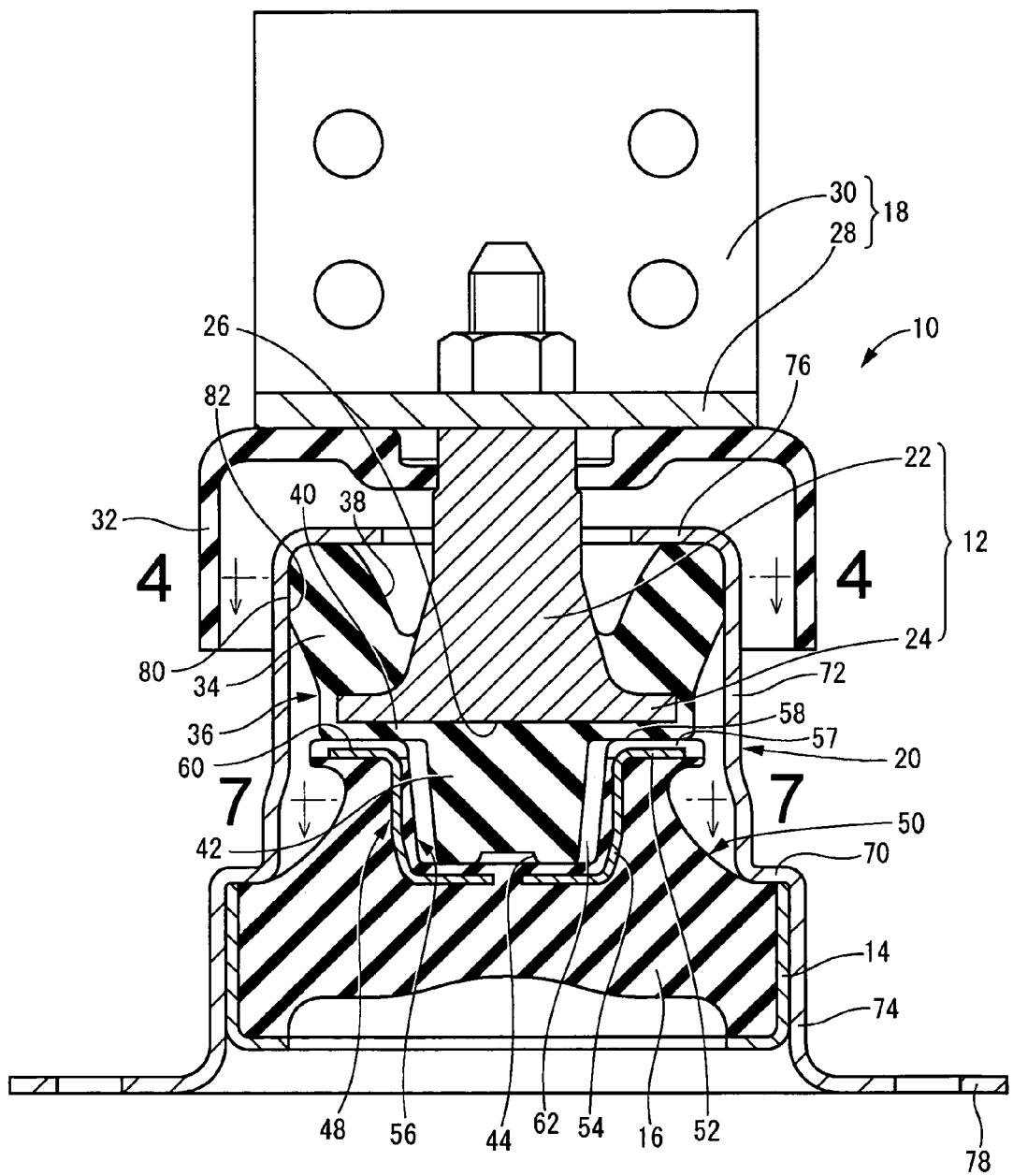
FIG. 1 is a vertical cross sectional view of a vibration damping device in the form of an automotive engine mount which is constructed according to a first embodiment of the invention, taken along line 1-1 of FIG. 4.
Figure 2:
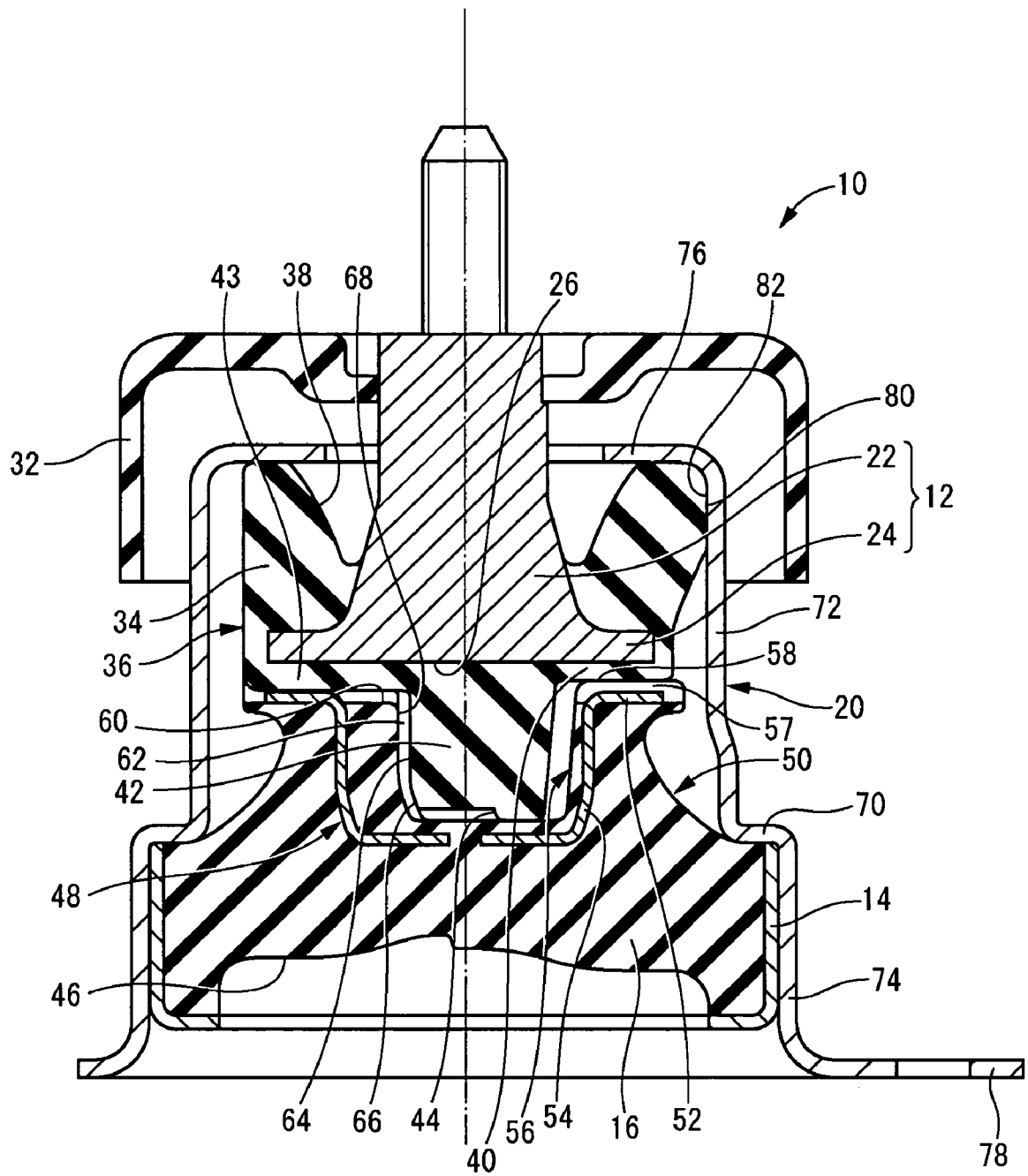
FIG. 2 is a vertical cross sectional view of the engine mount of FIG. 1, taken along line 2-2 of FIG. 4.

FIGS. 1-7 show an automotive engine mount 10 as a first embodiment of the invention. This engine mount 10 includes a first mounting member 12 of metal to be fixed to a power unit (not shown); a second mounting member 14 of metal to be fixed to the vehicle body (not shown); and a main rubber elastic body 16 disposed between them. By attaching the first mounting member 12 to a power unit of an automotive vehicle (not shown) via a bracket 18 on the power unit side, and attaching the second mounting member 14 to a body of the vehicle (not shown) via an outer bracket 20 serving as the tubular bracket, the power unit is supported on the body in a vibration damping manner. In FIGS. 1 and 2, the engine mount 10 is depicted not yet installed on the power unit and vehicle body (not shown). In the embodiment, with the engine mount 10 in the installed state, a distributed support load of the power unit (not shown) is input generally along the vertical in the axial direction of the mount, that is, the vertical direction in FIG. 1, and effective vibration damping action is exhibited against vibration input in the bound direction and rebound direction, which are the vertical direction in FIG. 1. In the description hereinbelow, the vertical direction normally refers to the vertical direction in FIG. 1.

To describe in greater detail, the first mounting member 12 is of generally solid cylindrical shape overall, and has a rod portion 22 and an abutting flange portion 24 as the rebound abutting portion. The rod portion 22 is of small diameter, generally solid cylindrical shape extending in the axial direction. The abutting flange portion 24 is integrally formed at the axial lower end of the rod portion 22 and spreads outwardly in the axis perpendicular direction. In this embodiment, a lower end face of this abutting flange portion 24 is constituted as a generally flat abutting face 26 extending in the axis perpendicular direction.

The first mounting member 12 of construction stated above is fixedly mounted to the power unit (not shown) via the power unit bracket 18. The power unit bracket 18 is formed of a rigid material such as steel, and has a structure comprising a lateral plate portion 28 to which the first mounting member 12 is attached, and a vertical plate portion 30 to which the power unit is attached. While not shown explicitly in the drawings, a reinforcing rib is disposed between the lateral plate portion 28 and the vertical plate portion 30, straddling their edges in the width direction. To the axial lower end face of the lateral plate portion 28 is affixed a bound stopper rubber 32 having inverted, generally bottomed tubular shape. This bound stopper rubber 32 is affixed at its bottom wall face to the lateral plate portion 28, and is perforated in its center portion in the axis perpendicular direction by an inner passage hole through which the first mounting member 12 is passed. A slight step portion is formed in an axially medial part on the outer circumferential face of the rod portion 22 in the first mounting member 12. The center of the bottom wall face of the bound stopper rubber 32 is positioned in the axial direction by means of this step portion.

The first mounting member 12 is bolted to the lateral plate portion 28 of the power unit bracket 18, while the power unit bracket 18 is affixed to the power unit by means of a bolt implanted in the vertical plate portion 30, thereby securing the first mounting member 12 to the power unit (not shown).

Figure 3:
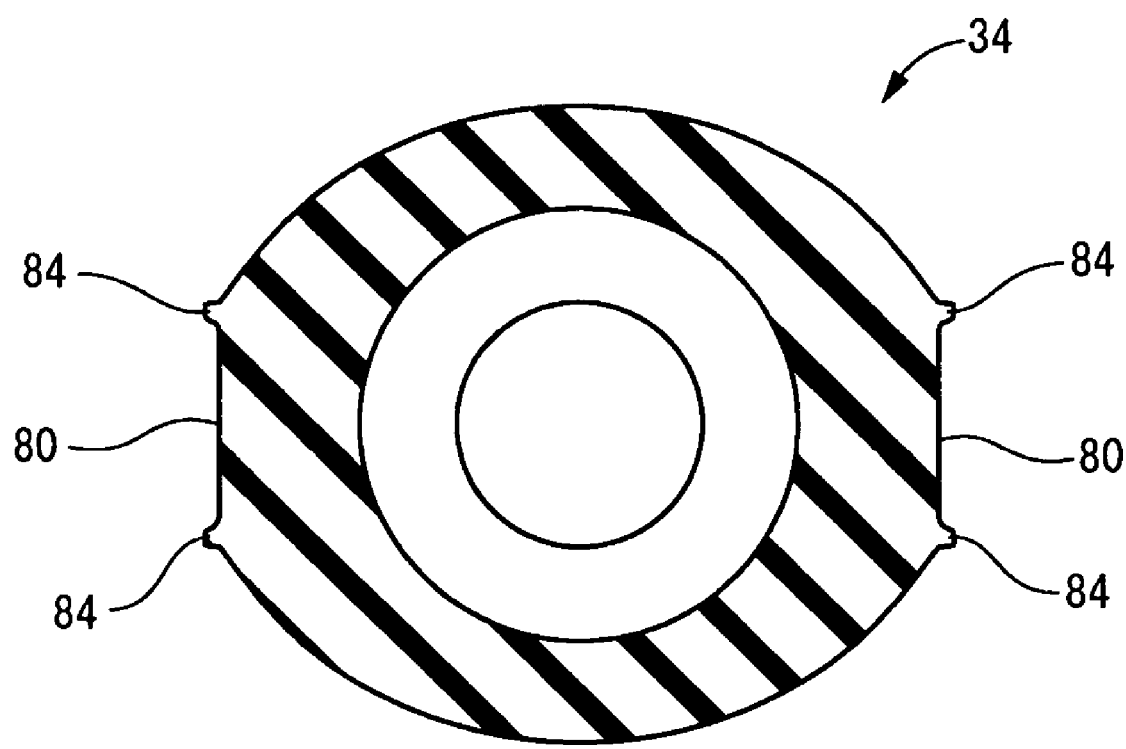
FIG. 3 is a transverse cross sectional view of a rebound stop rubber of the engine mount of FIG. 1.
Figure 4:
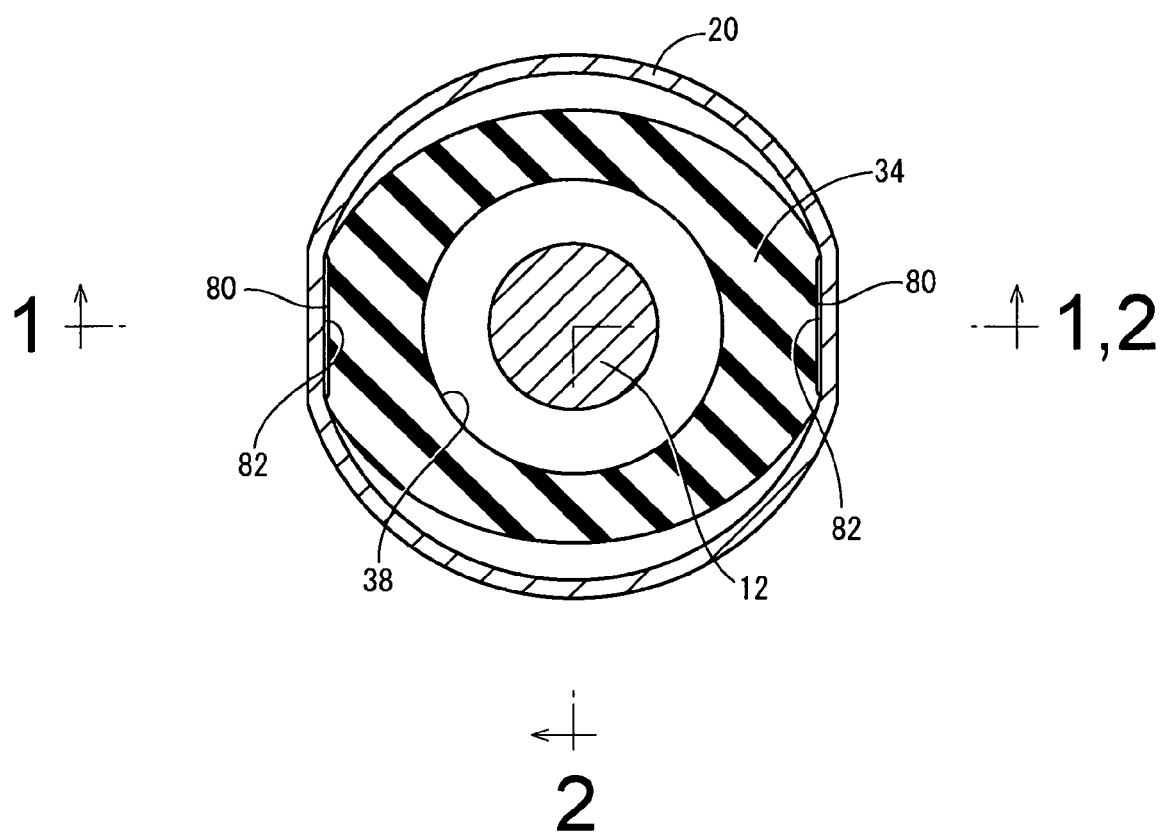
FIG. 4 is a transverse cross sectional view of the engine mount of FIG. 1, taken along line 4-4 of FIG. 1.

To this abutting flange portion 24 is fixed a rebound stopper rubber 34, serving as a cushioning rubber that projects upward in the generally axial direction. As depicted in FIGS. 3 and 4, this rebound stopper rubber 34 has a generally elliptical shape in plan view and extends in the axial direction, with the axial lower end portion thereof being vulcanization bonded to the axial lower end of the first mounting member 12, including the abutting flange portion 24. By means of this arrangement, the rebound stopper rubber 34 in this embodiment takes the form of a first integral vulcanization molded component 36 comprising the first mounting member 12. An inner circumferential face of the rebound stopper rubber 34 is constituted as a bowing inclined face that gradually inclines outward in the axis perpendicular direction towards the upper side in the axial direction. An outer circumferential face in the major axis direction thereof is constituted as a bowing inclined face that gradually inclines outward in the axis perpendicular direction towards the upper side in the axial direction, while the outer circumferential face in the minor axis direction thereof is constituted as a bowing face that extends in the generally axial direction. By means of this arrangement, in the rebound stopper rubber 34 of the embodiment, the peripheral wall portion in the major axis direction has a widening shape that rises axially upward with generally unchanging thickness dimension and extends outward gradually in the axis perpendicular direction, while the peripheral wall portion in the minor axis direction becomes gradually thinner towards the projecting distal end side. The rebound stopper rubber 34 in the embodiment extends out so that its inner circumferential face gradually becomes more distant along the entire circumference from the first mounting member 12 going axially upward, forming an annular recess 38 between the opposing faces of the rebound stopper rubber 34 and the first mounting member 12 in the axis perpendicular direction.

A cushioning rubber layer 40 integrally formed with the rebound stopper rubber 34 is affixed to the flat abutting face 26, which is covered substantially entirely by the cushioning rubber layer 40. A stopper projection 42 serving as a stopper rubber integrally formed with the cushioning rubber layer 40 is formed on the flat abutting face 26. This stopper projection 42 is of generally quadrangular bar shape extending with a generally oblong cross section, and is disposed so as to project axially downward on approximately the same center axis as the first mounting member 12. In this embodiment in particular, a single ridge 43 is formed so as to extend linearly in the minor axis direction of the rebound stopper rubber 34 and projects from the flat abutting face 26, integrally formed with the cushioning rubber layer 40. In this embodiment, the ridge 43 has a generally unchanging rectangular cross section and extends in the axis perpendicular direction.

Additionally, on the projecting distal end portion (axial lower end portion) of the stopper projection 42 there is formed a distal end slot 44 that opens onto the projecting distal end face and extends along one axis in the axis perpendicular direction. The distal end slot 44 is of groove shape extending in a straight line, and formed continuously so that its two ends open on the two side faces of the stopper projection 42 along one axis in the axial direction. In this embodiment in particular, the distal end slot 44 is formed so as to extend in a straight line along one axis in the axial direction, namely the minor axis direction of the stopper projection 42.

The second mounting member 14, on the other hand, has the form a thin walled, generally large diameter tube; in this embodiment in particular, it is constructed with the axial lower end portion of the second mounting member 14 bent towards the inside peripheral side in an internal flange configuration. The first mounting member 12 is disposed axially above and spaced apart from the second mounting member 14, on approximately the same center axis. The main rubber elastic body 16 is disposed between the first mounting member 12 and the second mounting member 14 disposed spaced apart in the axial direction in this way.

Figure 5:
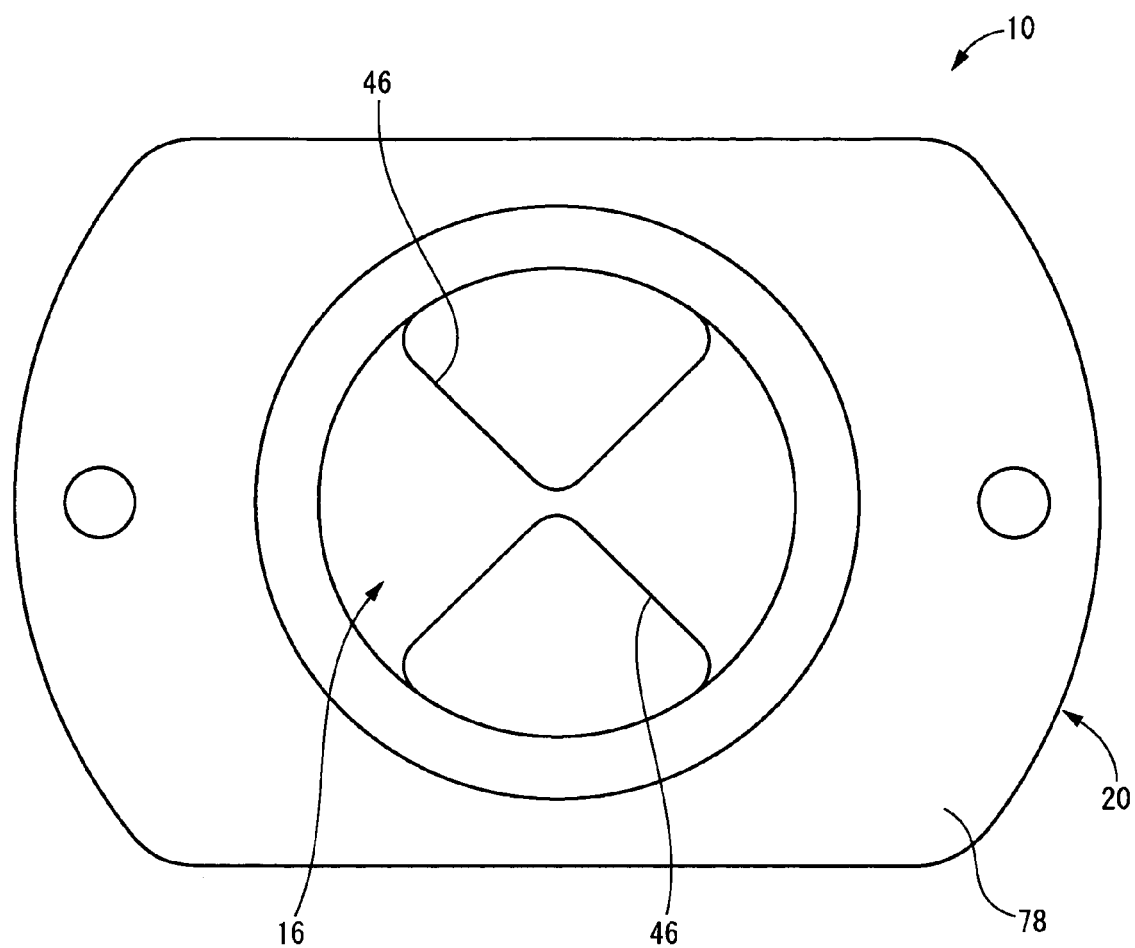
FIG. 5 is a bottom plane view of the engine mount of FIG. 1.

The main rubber elastic body 16 has a large diameter frustoconical shape overall, with the inner circumferential face of the second mounting member 14 being vulcanization bonded to the outer circumferential face of the large diameter end thereof. At the end on the large diameter side of the main rubber elastic body 16, there is formed a recess of inverted, generally conical shape so as to open on the end face on the large diameter side. In this embodiment in particular, owing to the different spring properties required in the vehicle front-to-back direction and the vehicle side-to-side direction, a pair of lightening portions 46 of generally fan configuration are disposed along one axis in the axis perpendicular direction on the floor of the recess, as depicted in FIG. 5. As noted, FIGS. 1 and 2 depict the engine mount 10 before the power unit is installed. With the power unit (not shown) installed on the engine mount 10, the main rubber elastic body 16 will be in a state of elastic deformation due to the power unit support load input in the axial direction.

To the small diameter end of the main rubber elastic body 16, there is vulcanization bonded a pressure receiving fitting 48 as a retainer member opening on the small diameter end face of the main rubber elastic body 16; the main rubber elastic body 16 in the embodiment is formed as a second integral vulcanization molded component 50 comprising the second mounting member 14 and the pressure receiving fitting 48.

This pressure receiving fitting 48 may consist, for example, of a pressed fitting formed by pressing a sheet of rigid material such as metal. The pressure receiving fitting 48 is a rotation symmetrical body of thin, generally cup shape having generally unchanging cross section about the entire circumference. At the rim of the opening of the pressure receiving fitting 48, there is integrally formed a flange shaped portion 52 as a pressure receiving flange that spreads outward in the axis perpendicular direction along the entire circumference. The outside diameter dimension of this flange shaped portion 52 is greater than the outside dimension of the abutting flange portion 24 in the first mounting member 12. Additionally, in proximity to the floor of the pressure receiving fitting 48, the peripheral wall portion thereof is constituted as a tapering peripheral wall portion 54 inclined so that diameter dimension of the pressure receiving fitting 48 becomes gradually smaller going axially downward. In this embodiment, the tapering peripheral wall portion 54 is formed all the way around the circumference. The tapering peripheral wall portion 54 may instead be formed in a portion of the axial direction and the circumferential direction in the peripheral wall portion of the pressure receiving fitting 48, or over its entire length. For example, it is not limited to a location in proximity to the floor of the pressure receiving fitting 48, but may instead be formed in the axially medial portion.

Figure 6:
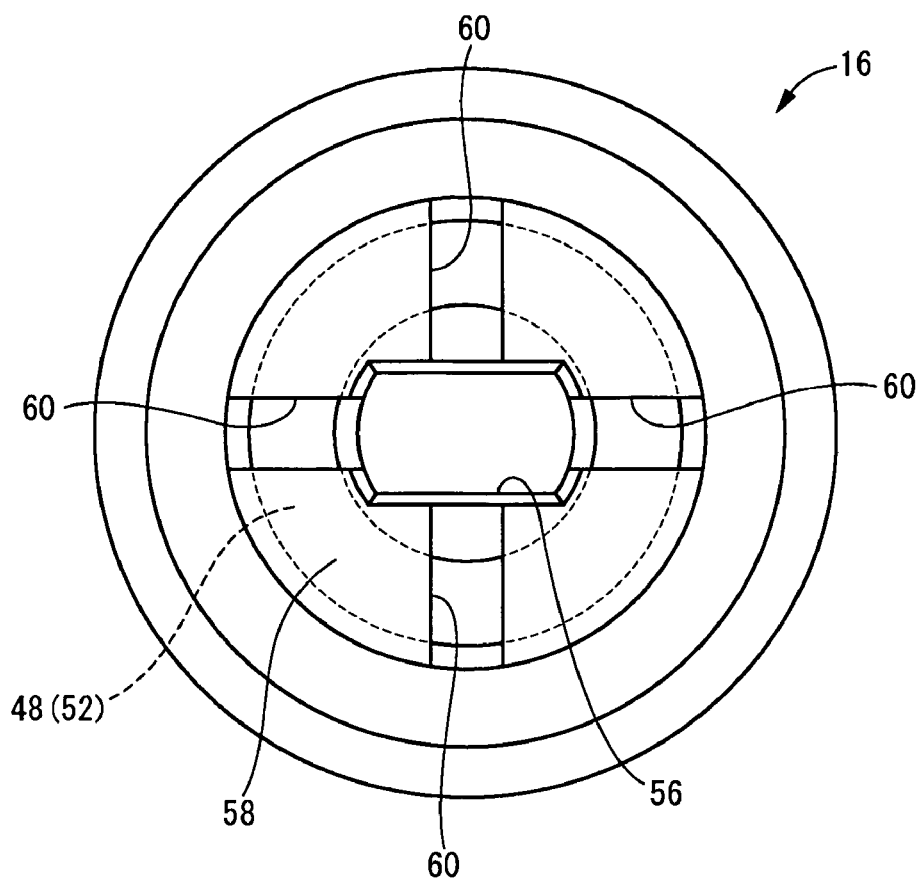
FIG. 6 is a top plane view of a main rubber elastic body of the engine mount of FIG. 1.

In the bottom wall of the pressure receiving fitting 48, there is formed a through-hole which passes through its center portion in the axial direction. Via this through-hole, an inner face rubber layer formed so as to cover substantially the entire inside face of the pressure receiving fitting 48 is integrally formed with the main rubber elastic body 16. By so doing, there is formed on the inside of the pressure receiving fitting 48 a mating recess 56 that opens towards the first mounting member 12 side, using the cup shape of the pressure receiving fitting 48. As depicted in FIG. 6, this mating recess 56 is a recess that opens onto the small diameter end of the main rubber elastic body 16, and that has an inner circumferential face shape generally corresponding to the outer circumferential face shape of the stopper projection 42. The depth dimension of the mating recess 56 is smaller than the projecting height dimension of the stopper projection 42 which projects axially downward from the first mounting member 12, and the dimension of the mating recess 56 in the axis perpendicular direction is slightly larger around the entire circumference, as compared with the dimension of the stopper projection 42 in the axis perpendicular direction.

In this embodiment, the main rubber elastic body 16 extends over the top of the pressure receiving fitting 48, thereby providing a rubber layer so as to cover the opening face of the pressure receiving fitting 48. A cushioning rubber layer 57 serving as an inside face rubber layer is formed by the upper end portion of the main rubber elastic body 16 which runs up over the top of the flange shaped portion 52 in the pressure receiving fitting 48, and by means of the upper end face of the cushioning rubber layer 57, there is formed a pressure receiving abutting face 58 which is flat and somewhat larger than the flat abutting face 26 on the first mounting member 12 side. At at least one location on the circumference of the flange shaped portion 52, there is formed in the cushioning rubber layer 57 a communicating slot 60 constituting a slot that opens upward in the axial direction (on the small diameter side of the main rubber elastic body 16) and that extends in the diametrical direction. In this embodiment in particular, four communicating slots 60 are formed at prescribed intervals in the circumferential direction.

The flat abutting face 26 formed on the first mounting member 12 side is superimposed in the axial direction against the pressure receiving abutting face 58 formed on the small diameter side of the main rubber elastic body 16, whereby the first integral vulcanization molded component 36 is assembled superimposed against the second integral vulcanization molded component 50 from axially above it and on approximately the same center axis therewith. In this assembled condition, the first integral vulcanization molded component 36 which comprises the first mounting member 12 is assembled together with the second integral vulcanization molded component 50 which comprises the main rubber elastic body 16, in an unattached state enabling it to move apart in the axial direction. In this assembled condition, the stopper projection 42 which is formed projecting axially downward from the lower face of the first mounting member 12 is inserted into the mating recess 56 formed by means of the pressure receiving fitting 48 affixed to the main rubber elastic body 16. In this embodiment in particular, the ridge 43 projecting from the flat abutting face 26 mates along one axis in the axis perpendicular direction with the communicating slot 60 formed on the small diameter end face of the main rubber elastic body 16. Also, in this embodiment, the outside diameter dimension of the stopper projection 42 is smaller around the entire circumference than the inside diameter dimension of the mating recess 56, forming a gap 62 between the outer circumferential face of the stopper projection 42 and the inner circumferential face of the mating recess 56.

Figure 7:
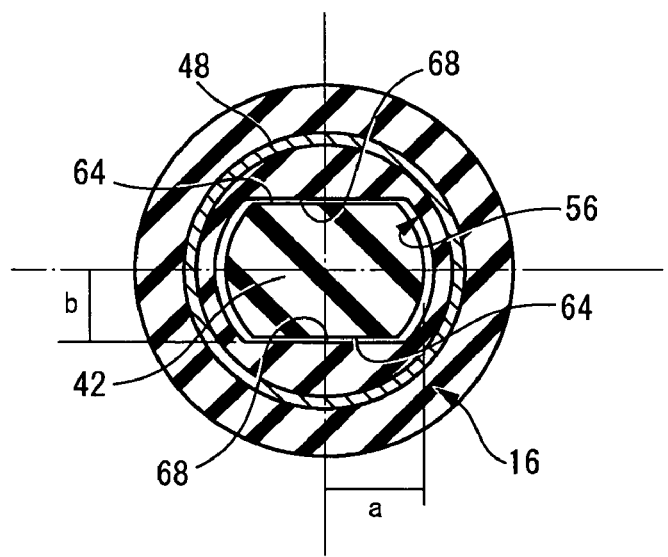
FIG. 7 is a transverse cross sectional view of the engine mount of FIG. 1, taken along line 7-7 of FIG. 1.

As depicted in FIG. 7, a pair of outside peripheral flat faces 64 are formed as second abutting faces on the outer circumferential face of the stopper projection 42. A pair of inside peripheral flat faces 68 are formed as second abutted faces on the inner circumferential face of the mating recess 56.

The pair of outside peripheral flat faces 64 are formed on the outer circumferential faces of the stopper projection 42, at either side in the minor axis direction which represent one axis in the axis perpendicular direction of the stopper projection 42, and have a diametrically opposed arrangement extending parallel to one another in the circumferential direction. The outer circumferential faces at either side in the major axis direction of the stopper projection 42 are constituted as arcuate curving faces. The projecting distal end portions to either side in the minor axis direction of the stopper projection 42 where the outside peripheral flat faces 64 are formed are constituted as tapering guide faces 66 composed of inclined faces that incline gradually inward in the axis perpendicular direction towards the projecting distal end side. By means of this tapering guide face 66, the stopper projection 42 gradually constricts in width towards the projecting distal end in the minor axis direction. The faces to either side in the major axis direction of the stopper projection 42 are constituted as inclined curving faces that incline gradually inward in the axis perpendicular direction towards the projection direction, along substantially the entire length in the projection direction, so that the stopper projection 42 becomes gradually smaller in diameter towards the projecting distal end side in the projecting distal end portion thereof. The tapering guide faces 66, which are the inclined faces formed on either side in the minor axis direction, may be formed in other various forms, but not limited to that in the present embodiment where the tapering guide faces 66 are formed only on the stopper projection 42. For instance, the tapering guide faces 66 may be formed by gradually decreasing the diameter of the stopper projection 42 from its proximal end to its distal end over its entire projection length.

Meanwhile, a pair of inside peripheral flat faces 68 are formed on the inner circumferential faces of portions situated to either side in the minor axis direction in the mating recess 56, and are constituted as flat faces in a diametrically opposed arrangement extending parallel to each other in the circumferential direction. The inner circumferential faces of portions situated to either side in the major axis direction in the mating recess 56 are constituted as curving faces extending in the circumferential direction.

With the stopper projection 42 mated with the mating recess 56, the outside peripheral flat faces 64 formed on the stopper projection 42 and the inside peripheral flat faces 68 formed in the mating recess 56 are positioned relative to each other in the circumferential direction and superimposed in the axis perpendicular direction. The gap 62 formed between opposed faces of the stopper projection 42 and the mating recess 56 is made small sufficiently, and the minor axis length and the major axis length in the stopper projection 42 and the mating recess 56 are made sufficiently different from each other. By means of this arrangement, relative rotation of the first mounting member 12 and the main rubber elastic body 16 in the circumferential direction is effectively prevented, and a main rubber rotation check mechanism can be constituted as a second rotation preventing mechanism for attaining positioning of the first mounting member 12 and the main rubber elastic body 16 in the circumferential direction. It should be appreciated that the largest radial dimension "a" of the stopper projection 42 (i.e., a radial in the diametric direction perpendicular to a direction in which the pair of outside peripheral flat faces 64 are opposed to each other), and the smallest radial dimension "b" of the mating recess 56 (i.e., a radial in the diametric direction where the pair of inside peripheral flat faces 68 are opposed to each other) are arranged to meet the condition "a>b", thereby preventing rotation of the stopper projection 42 within the mating recess 56.

In the present embodiment, the axial dimension (i.e. projection length) of the stopper projection 42 is greater than the axial dimension (i.e. depth) of the mating recess 56. Accordingly, the stopper projection 42 inserted into the mating recess 56 is forcedly pressed at its projection end face against the bottom face of the mating recess 56, so that the stopper projection 42 is compressed in the axial direction. This pre-compression of the stopper projection 42 in the axial direction may be established by utilizing a reaction force of the rebound stopper rubber 34 that is compressed by means of fixation of the outer bracket 20.

The outer bracket 20 is mounted fitting externally onto this first integral vulcanization molded component 36 and second integral vulcanization molded component 50. The outer bracket 20 is of thin walled, generally stepped tubular shape having a stepped portion 70 in its medial section in the axial direction, with a small diameter tube portion 72 situated axially above to one side of the stepped portion 70 and a large diameter tube portion 74 of larger diameter than the small diameter tube portion 72 situated axially below. At the axial upper end of the small diameter tube portion 72, there is formed a stopper abutting portion 76 of inner flange shape extending inward in the axis perpendicular direction. At the axial lower end of the large diameter tube portion 74, there is formed a mount plate 78 of flange shape extending outward in the axis perpendicular direction.

The first integral vulcanization molded component 36 is inserted into the small diameter tube portion 72 from the opening at the axial lower end of the outer bracket 20. Then, the second integral vulcanization molded component 50 is inserted into the large diameter tube portion 74. The upper end face of the second mounting member 14 making up the second integral vulcanization molded component 50 comes into abutment with the stepped portion 70 of the outer bracket 20 from axially below, thereby being positioned in the axial direction. With the second integral vulcanization molded component 50 being press fit into the large diameter tube portion 74 of the outer bracket 20, the second mounting member 14 is fixed to the outer bracket 20, and the second integral vulcanization molded component 50 is fixed in position to the outer bracket 20. A distal end of the rebound stopper rubber 34 fixed to the first mounting member 12 is held in abutting contact with the stopper abutting portion 76 of the outer bracket 20 from the axially lower side, whereby the first integral vulcanization molded component 36 is disposed in position in the axial direction between the stopper abutting portion 76 and the second integral vulcanization molded component 50. Thus, the first integral vulcanization molded component 36 and the second integral vulcanization molded component 50 are fixedly attached to the outer bracket 20, superimposed against it in the axial direction approximately coaxially.

In this mounted condition, the abutting flange portion 24 formed on the first mounting member 12 and the stopper abutting portion 76 formed on the outer bracket 20 are positioned in opposition spaced apart form each other in the axial direction. The rebound stopper rubber 34 is placed with its projecting distal end face abutting the lower face of the stopper abutting portion 76, and on the basis of the elasticity of the main rubber elastic body 16 is compressed in the axial direction between the axially opposed faces of the abutting flange portion 24 and the stopper abutting portion 76.

The outer bracket 20 is bolted to the vehicle body (not shown) by means of bolts (not shown) extending through bolt holes provided in the mount plate 78 of the outer bracket 20. With this arrangement, the second mounting member 14 is fixedly mounted onto the vehicle body via the outer bracket 20. In this mounted condition, the bottom wall portion of the bound stopper rubber 32 is positioned spaced apart in the axial direction from the stopper abutting portion 76 of the outer bracket 20, and the lower end portion of the peripheral wall in the bound stopper rubber 32 is positioned encircling the upper end portion of the peripheral wall in the outer bracket 20 about its entire circumference, but spaced apart from it in the axis perpendicular direction.

When the automotive engine mount 10 having the structure described here is subjected to input of vibration load across the vertical in the axial direction, and the first mounting member 12 and the second mounting member 14 undergo relative displacement moving them closer together in the axial direction by more than a prescribed extent, the lower face of the power unit bracket 18 fixed to the first mounting member 12 will come into cushioned abutment in the axial direction with the upper face of the stopper abutting portion 76 fixed to the second mounting member 14, via the bound stopper rubber 32. This arrangement provides the bound stopper mechanism in the embodiment, for cushion-wise limitation of the extent of relative displacement moving the first mounting member 12 and the second mounting member 14 closer together.

On the other hand, when the automotive engine mount 10 is subjected to input of vibration load across the vertical in the axial direction causing the first mounting member 12 and the second mounting member 14 to undergo relative displacement moving them apart in the axial direction, the rebound stopper rubber 34 becomes compressed in the axial direction between the opposing faces of the abutting flange portion 24 of the first mounting member 12 and the stopper abutting portion 76 of the outer bracket 20. This arrangement provides the rebound stopper mechanism in the embodiment, for cushion-wise limitation of the extent of relative displacement moving the first mounting member 12 and the second mounting member 14 apart.

As depicted in FIG. 3, a pair of abutting faces 80 are formed on the outer circumferential face of the rebound stopper rubber 34, serving as first abutting faces for positioning purposes, composed of flat surfaces spreading in the circumferential direction in a diametrically opposed arrangement. As depicted in FIG. 4, the axial upper portion of the small diameter tube portion 72 of the outer bracket 20 provides the mating tube portion in the embodiment. A pair of abutted faces 82 are formed on the mating tube portion, serving as first abutted faces composed of flat surfaces in a diametrically opposed arrangement for positioning purposes.

As depicted in FIG. 3, the abutting faces 80 consist of a pair of flat surfaces spreading parallel to each other, and formed to either side in the major axis direction confirming to one axis perpendicular direction of the rebound stopper rubber 34. Additionally, as illustrated in FIG. 3, press fit ridges 84 are integrally formed as pressure lips on the abutting faces 80 of the rebound stopper rubber 34, on the end faces to either side in the circumferential direction thereof. The press fit ridges 84 consist of one ridge formed at each of the end faces to either side in the circumferential direction of the abutting face 80, projecting outward in the axis perpendicular direction and extending over the entire axial length. In this embodiment in particular, the press fit ridges 84 have substantially unchanging semicircular cross section along their entire length.

On the other hand, as depicted in FIG. 4, the abutted faces 82 consist of a pair of flat surfaces formed on the inner circumferential face of the outer bracket 20 and extending parallel to each other, disposed in opposition in the axis perpendicular direction. The abutted faces 82 are of circumferential width dimension about equal to the circumferential width dimension of the abutting faces 80. In this embodiment, the distance separating the opposing faces of the pair of abutted faces 82 is smaller than the distance separating the projecting distal edges of the press fit ridges 84 formed on each of the pair of abutting faces 80, but greater than the distance between the two faces of the pair of abutting faces 80. In this embodiment, the inner circumferential face and the outer circumferential face of the outer bracket 20 are both flat surfaces in the peripheral wall portions where the abutted faces 82 are formed.

The first integral vulcanization molded component 36 is attached to the outer bracket 20, with the diametrically opposed abutting faces 80 formed on the rebound stopper rubber 34 making up part of the first integral vulcanization molded component 36 aligned in the circumferential direction with respect to the diametrically opposed abutted faces 82 formed on the small diameter tube portion 72 of the outer bracket 20, and superimposed thereon in the axis perpendicular direction. In this mounted condition, the press fit ridges 84 projecting from the abutting faces 80 of the rebound stopper rubber 34 are pressed against the abutted faces 82 in the outer bracket 20, becoming compressed in the direction of opposition of the pair of abutted faces 82. In this embodiment, the abutting faces 80 press against the abutted faces 82 via the press fit ridges 84, so that a slight gap is formed between the opposed abutting face 80 and abutted face 82, and the abutting face 80 and abutted face 82 do not come into abutment directly, but press against each other indirectly.

With this arrangement, the rebound stopper rubber 34 and the outer bracket 20 are positioned in the circumferential direction by the positioning action produced by means of abutting contact between the abutting faces 80 and the abutted faces 82, thereby preventing relative rotation. In the present invention, the abutting faces 80 and the abutted faces 82 press against each other via the press fit ridges 84 in the axis perpendicular direction. Accordingly the rebound stopper rubber 34 and the outer bracket 20 are fixedly positioned relative to each other in the circumferential direction, thereby suppressing relative rotation between the two members more efficiently. With this positioning action, the outer bracket 20 and the first mounting member 12 to which the rebound stopper rubber 34 is affixed are fixedly positioned in the circumferential direction, thereby constituting a bracket rotation check mechanism as a first rotation preventing mechanism for preventing relative rotation of the first mounting member 12 and the outer bracket 20.

According to this embodiment, the outer circumferential face of the rebound stopper rubber 34 is positioned in abutment against the inner circumferential face of the outer bracket 20 via the press fit ridges 84 in the axis perpendicular direction in which the pair of abutting faces 80 are formed, i.e. the major axis direction of the rebound stopper rubber 34. In the axis perpendicular direction which approximately perpendicular to the direction in which the pair of abutting faces 80 are formed, i.e. the minor axis direction of the rebound stopper rubber 34, the rebound stopper rubber 34 is spaced apart from the outer bracket 20 in the axis perpendicular direction. With this arrangement, the spring constants in the major axis direction and the minor axis direction are adjusted so as to be different from one another.

In the automotive engine mount 10 of construction according to this embodiment, diametrically opposed abutting faces 80 and abutted faces 82 are formed respectively on the rebound stopper rubber 34 and the outer bracket 20 which together constitute the rebound stopper mechanism for limiting relative displacement of the first mounting member 12 and the second mounting member 14. With these abutting faces 80 and abutted faces 82 superimposed and pressing against one another, thereby constituting a bracket rotation check mechanism for preventing relative rotation of the outer bracket 20 and the first mounting member 12 to which the rebound stopper rubber 34 is affixed, as well as fixedly aligning the first mounting member 12 and the outer bracket 20 in the circumferential direction. Consequently, relative rotation of the first mounting member 12 and the outer bracket 20 can be prevented during shipping, storage and so on, and the first mounting member 12 and the outer bracket 20 can be easily mounted in a specific orientation on the power unit bracket 18 and the vehicle body.

Specifically, the first mounting member 12 needs to be mounted in a specific orientation on the power unit bracket 18. The outer bracket 20, meanwhile, needs to be mounted in a specific orientation onto a component on the vehicle body side. Accordingly, if the first mounting member 12 and the outer bracket 20 undergo relative rotation, there is a risk that it will not be possible to mount both the first mounting member 12 and the outer bracket 20 in their proper respective orientations. In the engine mount 10 of the embodiment, by means of preventing such relative rotation, the first mounting member 12 and the outer bracket 20 can be maintained in a state aligned with the proper orientation in the circumferential direction.

In the embodiment, outside peripheral flat faces 64 and inside peripheral flat faces 68 in diametrically opposed arrangement are formed respectively on portions of the outer circumferential face of the stopper projection 42 integrally formed with the rebound stopper rubber 34, and on portions of the inner circumferential face of the mating recess 56 formed in the main rubber elastic body 16. By means of aligning these flat faces 64, 68 with each other in the circumferential direction and superimposed thereon, there is constituted a main rubber rotation check mechanism for preventing relative rotation of the main rubber elastic body 16 and the first mounting member 12 to which the stopper projection 42 is affixed, and for fixedly aligning the first mounting member 12 and the main rubber elastic body 16 in the circumferential direction. Consequently, the main rubber elastic body 16, which has been imparted with spring properties that vary between the vehicle traveling direction and the vehicle lateral direction by means of forming a pair of lightening portions 46 along one axis in the axis perpendicular direction, can be easily mounted with the proper orientation.

In this embodiment in particular, the ridge 43 which projects from the lower end face of the first mounting member 12 mates with the communicating slot 60 formed so as to open on the small diameter end face of the main rubber elastic body 16. Accordingly, rotation of the main rubber elastic body 16 with respect to the first mounting member 12 can be prevented more effectively, and positioning of the main rubber elastic body 16 and the first mounting member 12 in the circumferential direction can be attained.

As will be apparent from the preceding description, the main rubber elastic body 16 in the embodiment is fixedly positioned in the circumferential direction with respect to both the first mounting member 12 and the outer bracket 20, by means of the main rubber rotation check mechanism and the bracket rotation check mechanism.

By means of the press fit ridges 84 formed on both circumferential sides of the abutting faces 80 of the rebound stopper rubber 34, a lower level of press fitting force is needed when press fitting the rebound stopper rubber 34 into the outer bracket 20. This permits a readily installation of the rebound stopper rubber 34 into the outer bracket 20. In this embodiment in particular, the press fit ridges 84 situated on both circumferential sides of the abutting faces 80 take the form of ridges formed extending over the entire length in the axial direction, i.e. the press fitting direction. Thus, durability with respect to the action of external force during press fitting can be advantageously improved.

In the embodiment, the gap 62 is formed along the entire circumferential between the outer circumferential face of the stopper projection 42 and the inner circumferential face of the mating recess 56. Consequently, the stopper projection 42 can be inserted easily into the mating recess 56. In particular, at least the distal end portion of the stopper projection 42 has a tapering shape that becomes smaller in diameter towards the projecting distal end by means of tapering guide faces 66, whereby the stopper projection 42 can be inserted more easily into the mating recess 56.

Further, in this embodiment, the projecting length dimension of the stopper projection 42 is greater than the depth dimension of the mating recess 56. Consequently, where the first mounting member 12 and the main rubber elastic body 16 return to abutment after being apart, the stopper projection 42 is the first part to come into abutment with the main rubber elastic body 16 side, thereby alleviating the impact during abutment between the first mounting member 12 and the main rubber elastic body 16, and preventing the occurrence of noise. Additionally, since compressive force is applied in advance to the stopper projection 42, the spring properties can be adjusted to improve the vibration damping ability.

Additionally, in this embodiment, the distal end slot 44 is formed in the distal end portion of the stopper projection 42, with the two ends thereof connecting with the gap 62 disposed between the outer circumferential face of the stopper projection 42 and the inner circumferential face of the mating recess 56. Further, the communicating slot 60 is formed opening onto the small diameter side of the main rubber elastic body 16 and extending in the diametrical direction. With a first end of the communicating slot 60 connecting with the gap 62 and the other end connecting with the outside (between the axis perpendicular direction superimposed faces of the outer bracket 20 and the main rubber elastic body 16), whereby the air present inside the mating recess 56 can be directed to the outside when the stopper projection 42 is inserted into the mating recess 56. This arrangement makes it possible to avoid action of an air spring within the mating recess 56, to permit the elastic deformation of the stopper projection 42 upon pressing of its distal end face against the inner bottom face of the mating recess 56, and to carry out with ease the insertion of the stopper projection 42 into the mating recess 56.

Figure 8:
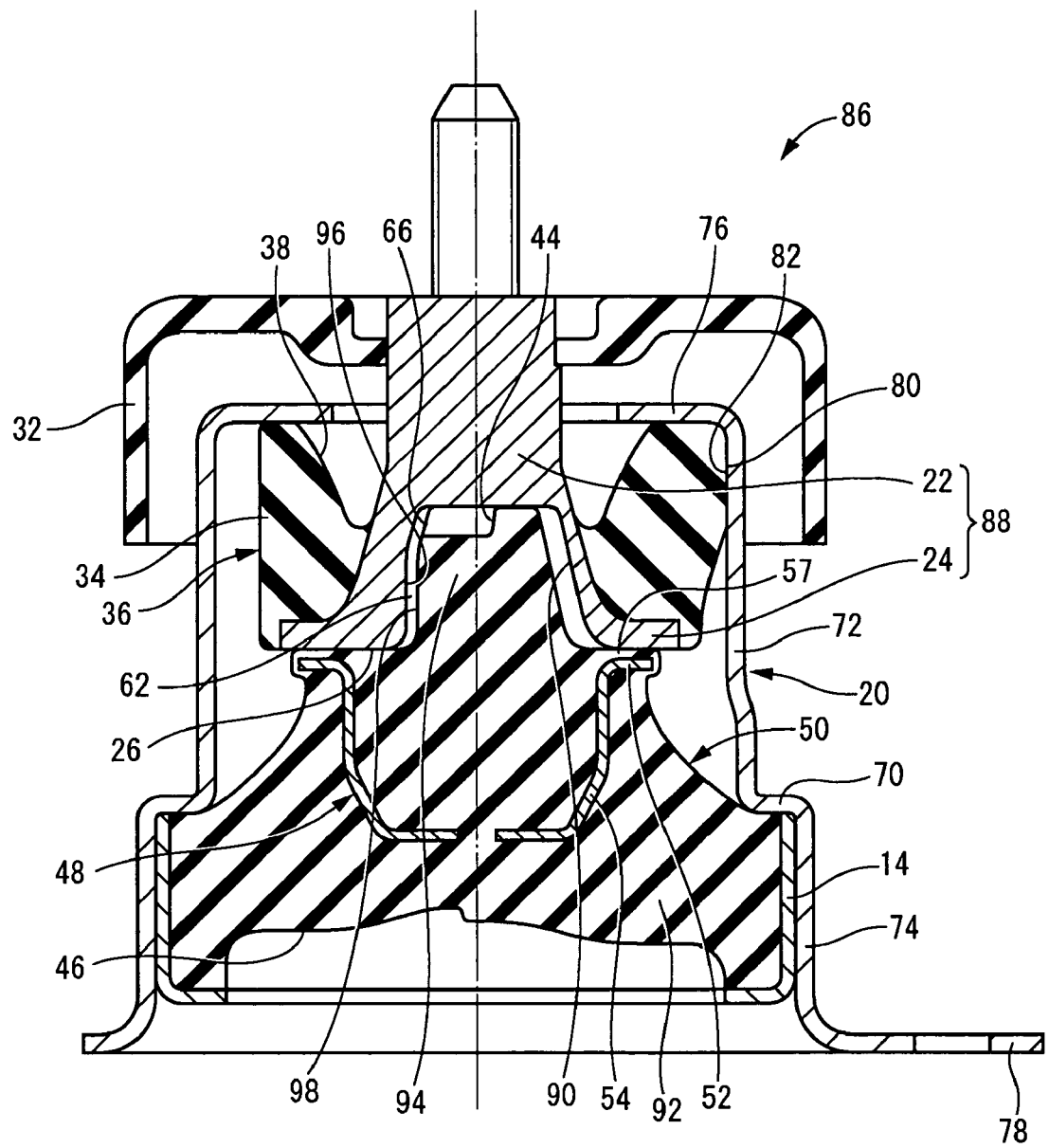
FIG. 8 is a vertical cross sectional view of an automotive engine mount of construction according to a second embodiment of the invention.

Referring now to FIG. 8, there is depicted an automotive engine mount 86 as a second embodiment of the invention. In this engine mount 86, a stopper projection 94 projecting axially upward from the small diameter end face of a main rubber elastic body 92 mates with a mating recess 90 formed opening onto lower end face of a first mounting member 88, thereby constituting a main rubber rotation check mechanism. In the following description, parts and regions substantially identical to those in the preceding first embodiment shall be assigned the same symbols in the drawings and shall not be described in any detail.

To describe in greater detail, the first mounting member 88 has the rod portion 22 and the abutting flange portion 24 similar to those in the first embodiment described previously. At its axial lower end is disposed the mating recess 90, so as to open onto the axial lower end face. This mating recess 90 is a recess having a generally oblong cross section, whose inside wall faces to either side in the minor axis direction thereof constitute a pair of inside peripheral flat faces 96 in diametrically opposed arrangement extending parallel to one another, and whose inside wall faces to either side in the major axis direction constitute tapering faces that incline so as to gradually approach one another towards the upper side in the axial direction, which is the floor portion of the mating recess 90.

Meanwhile, the main rubber elastic body 92 of this embodiment has a generally frustoconical shape overall, with the main rubber elastic body 92 filling the inner peripheral side of a pressure receiving fitting 48 of generally cup shape vulcanization bonded to its small diameter end. The stopper projection 94 is integrally formed so as to project axially upward from the main rubber elastic body 92 filling the inner peripheral side of the pressure receiving fitting 48. The stopper projection 94 is of generally oblong shape in plan view, and its inside wall faces on either side in the minor axis direction constitute outside peripheral flat faces 98 in diametrically opposed arrangement extending parallel to one another, while its inside wall faces on either side in the major axis direction constitute tapering faces that incline so as to gradually constrict in width towards the upper side in the axial direction, which is the projecting distal end side of the stopper projection 94. The projecting distal end portion of the outside peripheral flat face 98 constitutes a tapering guide face 66 composed of an inclined face that gradually inclines inwardly in the axis perpendicular direction towards the upper side in the axial direction; in the projecting distal end portion, the stopper projection 94 gradually constricts in width in the minor axis direction as well. On the projecting distal end of the stopper projection 94 is disposed the distal end slot 44 formed so as to open onto the projecting distal end face. This distal end slot 44 is of groove shape extending continuously in the axis perpendicular direction, with its two ends opening onto the peripheral wall face of the stopper projection 94. In this embodiment, the distal end slot 44 is formed so as to extend in a straight line in the minor axis direction of the stopper projection 94.

The first mounting member 88 and the main rubber elastic body 92 are arranged with the lower end face of the first mounting member 88 superimposed against the small diameter end face of the main rubber elastic body 92 from above in the axial direction, to attach them together. The stopper projection 94 projecting from the main rubber elastic body 92 is mated, by means of being inserted from axially below, with the mating recess 90 formed opening on the first mounting member 88. In this embodiment, the projecting height dimension of the stopper projection 94 is greater than the depth dimension of the mating recess 90, so that with the first mounting member 88 and the main rubber elastic body 92 in the assembled state, the stopper projection 94 is compressed in the axial direction. The circumferential length of the inner circumferential face of the mating recess 90 in this embodiment is relatively larger than the circumferential length of the outer circumferential face of the stopper projection 94, forming the gap 62 all the way around the circumference between the opposed inner circumferential face of the mating recess 90 and outer circumferential face of the stopper projection 94.

With the first mounting member 88 and the main rubber elastic body 92 in the assembled state, the minor axis direction of the mating recess 90 and the minor axis direction of the stopper projection 94 are aligned. The pair of inside peripheral flat faces 96 formed on the inner circumferential face of the mating recess 90 and the pair of outside peripheral flat faces 98 formed on the outer circumferential face of the stopper projection 94 are aligned in the circumferential direction, with the inside peripheral flat faces 96 and the outside peripheral flat faces 98 superimposed against one another in the axis perpendicular direction. The distal end slot 44 formed on the distal end portion of the stopper projection 94 connects at its two ends to the gap 62. The gap 62 formed between the stopper projection 94 and the mating recess 90 is formed with a small dimension, so that the stopper projection 94 does not rotate within the mating recess 90.

In the engine mount 86 of construction according to this embodiment as well, positioning of the first mounting member 88 and the outer bracket 20 or the main rubber elastic body 92 in the circumferential direction may be attained, and advantages substantially the same as the various advantages afforded in the engine mount 10 pertaining to the first embodiment may be effectively achieved.

Figure 9:
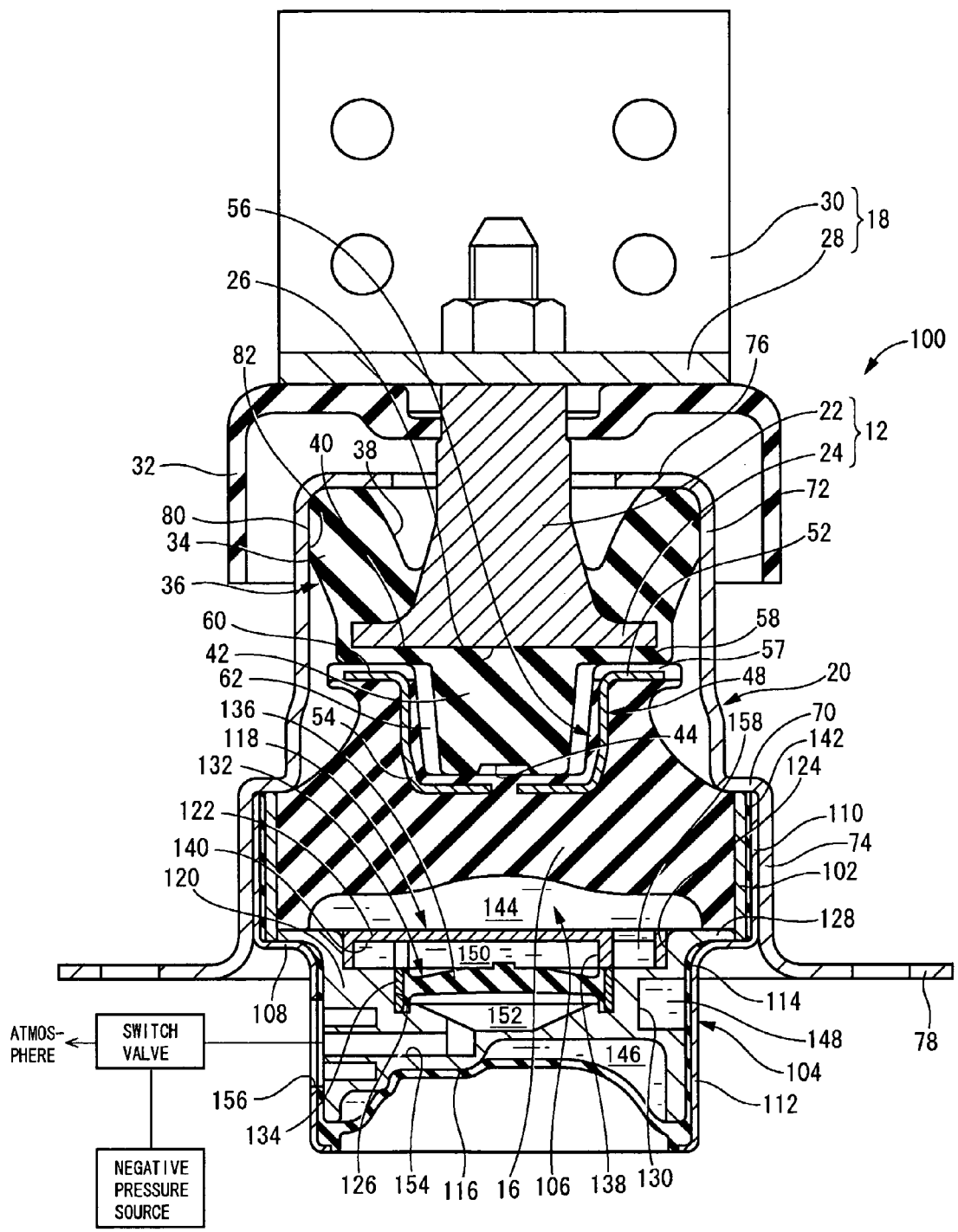
FIG. 9 is a vertical cross sectional view of an automotive engine mount of construction according to a third embodiment of the invention.

FIG. 9 depicts an automotive engine mount 100 as a third embodiment of the invention. In this engine mount 100, a tubular retaining member 104 is mounted onto the second mounting member 102 by being fitted externally thereon from axially above, and a fluid chamber 106 is formed on the axis perpendicular inward side of the tubular retaining member 104, situated axially below the main rubber elastic body 16. Like in FIG. 1 and FIG. 2 illustrating the first embodiment, FIG. 9 shows the engine mount 100 in the unattached state. In the attached state, as in the first embodiment, the distributed support load of the power unit (not shown) is input across the vertical in the axial direction (the vertical in FIG. 9).

To describe in more detail, the second mounting member 102 has a thin walled, large diameter generally tubular shape, and extends straight in the axial direction.

The tubular retaining member 104 has a medial stepped portion 108 giving it a generally stepped tubular shape overall, with a mount tube portion 110 of thin walled, generally tubular shape situated axially above the medial stepped portion 108 and a retaining portion 112 of thin walled, generally tubular shape smaller in diameter than the mount tube portion 110, situated axially below. The second mounting member 102 is inserted into the mount tube portion 110 from the opening on the mount tube portion 110 side of the second mounting member 102 (opening on the axial upper end) so as to be superimposed against it in an internally fitted state, while the outer bracket 20 is attached fitting externally onto the mount tube portion 110 from above in the axial direction, whereby the mount tube portion 110 is fixedly retained clamped between the second mounting member 102 and the tubular bracket 20. The inner circumferential face of the mount tube portion 110 is covered by a sealing rubber layer 114 all the way around the circumference, providing fluid-tight assembly of the second mounting member 102 and the mount tube portion 110.

At the opening of the tubular retaining member 104 on the retaining portion 112 side (opening on the axial lower end), a diaphragm 116 is disposed as a flexible film, providing fluid-tight closure to the opening on the retaining portion 112 side. The diaphragm 116 is a thin rubber film of generally circular shape overall, affixed at the outside peripheral edge thereof to the axial lower edge of the tubular retaining member 104 around the entire circumference.

By means of this design, the opening on the axial upper end of the tubular retaining member 104 is capped fluid-tightly by the main rubber elastic body 16, while the opening on the axial lower end of the tubular retaining member 104 is capped fluid-tightly by the diaphragm 116, forming between the axially opposing faces of the main rubber elastic body 16 and the diaphragm 116 a fluid chamber 106 in which is sealed a noncompressible fluid.

Additionally, the fluid chamber 106 accommodates a partition member 118 disposed therein extending in the axis perpendicular direction. This partition member 118 is of thick, generally disk shape overall. In this embodiment, it includes a partition member body 120 and a cover plate member 122.

The partition member body 120 is of thick, generally disk shape overall, having a circular recess 124 formed in the center portion of its upper end, and a housing recess 126 smaller in diameter than the circular recess 124, situated in the center of the circular recess 124. On the axial upper end of the partition member body 120 is formed a support portion 128 of flange form extending outward in the axis perpendicular direction. On the outer circumferential face of the partition member body 120 is formed a circumferential groove 130 opening outward in the axis perpendicular direction and extending a prescribed distance in the circumferential direction. While not shown in the drawing, the end of the circumferential groove 130 on one side in the circumferential direction extends axially upward, opening onto the upper face of the partition member body 120, while the end of the circumferential groove 130 on the other side in the circumferential direction extends axially downward, opening onto the lower face of the partition member body 120.

A movable rubber plate 132 is disposed within the housing recess 126 of the partition member body 120. The movable rubber plate 132 is formed by means of affixing the outer circumferential face of a circular rubber plate 136 of generally disk shape about its entire circumference to the inner circumferential face of a fastening ring 134 of generally annular shape. The element is disposed within the housing recess 126 by means of fastening ring 134 being press fit into the housing recess 126. The center portion of the floor of the housing recess 126 of a tapering recess of generally bowl shape, and the lower face of the movable rubber plate 132 is spaced apart in the axial direction from the floor of the housing recess 126.

Meanwhile, the cover plate member 122 is of generally disk shape, and has an outside diameter dimension approximately the same as the inside diameter dimension of the circular recess 124 formed in the upper face of the partition member body 120. A center recess 138 of generally circular shape is formed in the center portion of its lower face, and a slot 140 that opens axially downward and extends continuously over a prescribed distance in the circumferential direction is formed in the outside peripheral section of its lower face. This cover plate member 122 is fitted into the circular recess 124 of the partition member body 120 from axially above, with the center recess 138 of the cover plate member 122 positioned axially above the housing recess 126, while the opening of the slot 140 is covered by the bottom face of the housing recess 126 in the partition member body 120, constituting a tunnel shaped flow passage.

The partition member 118 constructed in this way is installed in an internally fitted state by being inserted into the retaining portion 112 of the tubular retaining member 104. The support portion 128 of the partition member body 120 over the entire circumference thereof is held clamped between the lower end face of the outside peripheral portion of the main rubber elastic body 16 and the upper face of the medial stepped portion 108 of the tubular retaining member 104, thereby being positioned accommodated within the fluid chamber 106 so as to extend in the axis perpendicular direction. The inner circumferential face of the retaining portion 112 is covered by a seal rubber layer 142 integrally formed with the diaphragm 116, so that the partition member 118 is attached fluid-tightly to the tubular retaining member 104 by means of the seal rubber layer 142.

With this arrangement, the fluid chamber 106 is divided into two parts arranged in the vertical or axial direction to either side of the partition member 118. Namely, to one side of the partition member 118 in the axial direction, there is formed a pressure receiving chamber 144 a portion of whose wall is constituted by the main rubber elastic body 16, and that gives rise to pressure fluctuations. To the other side of the partition member 118 in the axial direction, there is formed an equilibrium chamber 146 a portion of whose wall is constituted by the diaphragm 116 and that permits change in volume.

The opening on the diametrical outer side of the circumferential groove 130 formed on the outer circumferential face of the partition member body 120 is covered fluid-tightly by the inner circumferential face of the tubular retaining member 104 via the seal rubber layer 142, thereby forming a tunnel shaped flow passage that connects the pressure receiving chamber 144 with the equilibrium chamber 146. By means of this flow passage, there is formed a first orifice passage 148 that permits flow of fluid between the pressure receiving chamber 144 and the equilibrium chamber 146. In this embodiment, the passage cross sectional area and passage length of the first orifice passage 148 are established such that vibration damping action based on the resonance behavior etc. of the fluid caused to the flow through the first orifice passage 148 can be exhibited effectively against low frequency vibration such as shaking vibration.

In the zone between the axially opposed faces of the cover plate member 122 and the movable rubber plate 132 is sealed a noncompressible fluid similar to that in the fluid chamber 106, forming an intermediate chamber 150. The zone between the axially opposed faces of the movable rubber plate 132 and the partition member body 120 constitutes a working air chamber 152; an air passage 154 extending from part of the outer circumferential face of the partition member body 120 connects with this working air chamber 152. The air passage 154 at a first end thereof is exposed to the outside through a through-hole 156 formed in the retaining portion 112 of the tubular retaining member 104, allowing the pressure within the working air chamber 152 to be adjusted from the outside.

The tunnel shaped flow passage produced when the opening of slot 140 formed in the outside peripheral portion of the cover plate member 122 is covered by the partition member body 120 communicates at its two circumferential ends with the pressure receiving chamber 144 and the intermediate chamber 150, respectively. By means of this arrangement there is formed a second orifice passage 158 connecting together the pressure receiving chamber 144 and the intermediate chamber 150, permitting flow of fluid between the pressure receiving chamber 144 and the intermediate chamber 150.

When the engine mount 100 having the structure described above is subjected to input of vibration load in the vertical direction, i.e. the axial direction, relative pressure fluctuations are produced between the pressure receiving chamber 144 and the equilibrium chamber 146 and the intermediate chamber 150 by means of elastic deformation of the main rubber elastic body 16. Upon input of vibration having a low frequency to which the first orifice passage 148 is tuned, flow of fluid through the first orifice passage 148 is produced between the pressure receiving chamber 144 and the equilibrium chamber 146 in association with these pressure fluctuations. On the basis of the fluid resonance behavior etc. produced by the flow of fluid, excellent vibration damping action is attained. In the event that vibration of a frequency higher than the tuning frequency of the first orifice passage 148 is input, the first orifice passage 148 becomes substantially blocked off, thereby producing fluid flow through the second orifice passage 158 between the pressure receiving chamber 144 and the intermediate chamber 150. Additionally, when further high frequency vibration is input, the working air chamber 152 formed axially below the movable rubber plate 132 is connected to the atmosphere through the air passage 154, so that the interior of the working air chamber 152 is at approximately atmospheric pressure. With this arrangement, the movable rubber plate 132 is allowed to undergo displacement in the axial direction through elastic deformation, whereby the input vibration can be absorbed advantageously through the displacement of the movable rubber plate 132. In the event that vibration of the frequency to which the first orifice passage 148 has been tuned is input, negative pressure is caused to act on the working air chamber 152, and the movable rubber plate 132 becomes constrained by being sucked towards the working air chamber 152 side. By means of this, the level of fluid caused to flow through the first orifice passage 148 is advantageously assured, and vibration damping action by the first orifice passage 148 is effectively attained.

In the automotive engine mount 100 constructed in accordance with this embodiment as well, advantages generally analogous to those in the first embodiment described previously can be achieved. In the automotive engine mount 100 pertaining to this embodiment, it is possible to achieve excellent vibration damping action through resonance behavior of fluid caused to flow through the orifice passages 148, 158, through fluid pressure absorbing effect owing to elastic deformation of the movable rubber plate 132, and so on.

Additionally, in the automotive engine mount 100 pertaining to this embodiment, the air passage 154 for selectively subjecting the working air chamber 152 to the action of negative pressure or atmospheric pressure from the outside is connected at one end thereof to the working air chamber 152 and at the other end is exposed to the outside from part of the outside circumferential wall of the main rubber elastic body 16. It is necessary that this other end be aligned in the circumferential direction with the through-hole 156 formed in the outer bracket 20. In this embodiment, since the first mounting member 12 is positioned in the circumferential direction with respect to the outer bracket 20 by means of the bracket rotation check mechanism, and the main rubber elastic body 16 is fixedly positioned in the circumferential direction with respect to the first mounting member 12 by means of the main rubber rotation check mechanism, the main rubber elastic body 16 is fixedly positioned in the circumferential direction with respect to the outer bracket 20, and the other end of the air passage 154 is consistently maintained in alignment in the circumferential direction with the through-hole 156 formed in the outer bracket 20.

Figure 10:
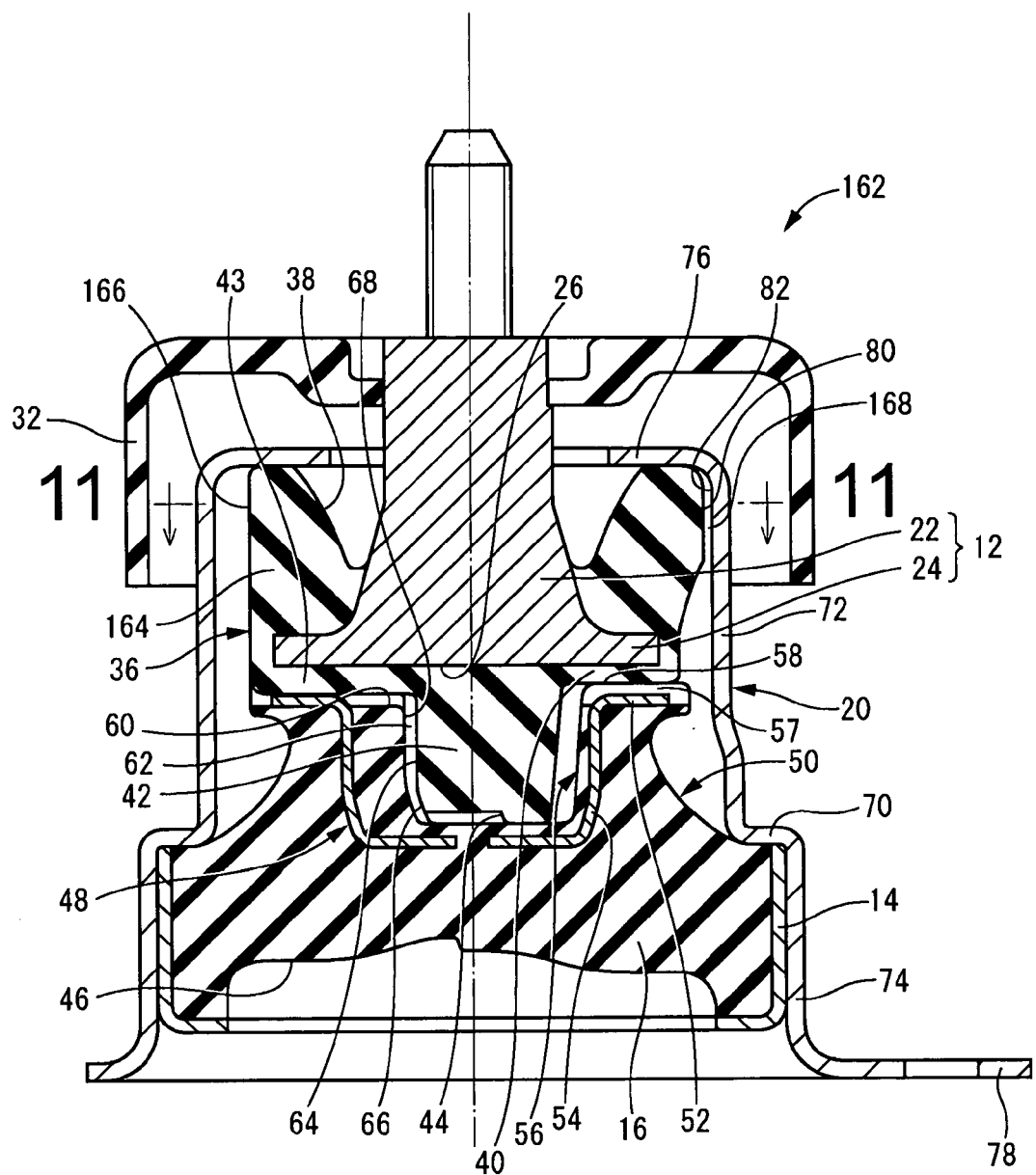
FIG. 10 is a vertical cross sectional view of an automotive engine mount of construction according to a fourth embodiment of the invention, taken along line 10-10 of FIG. 11.
Figure 11:
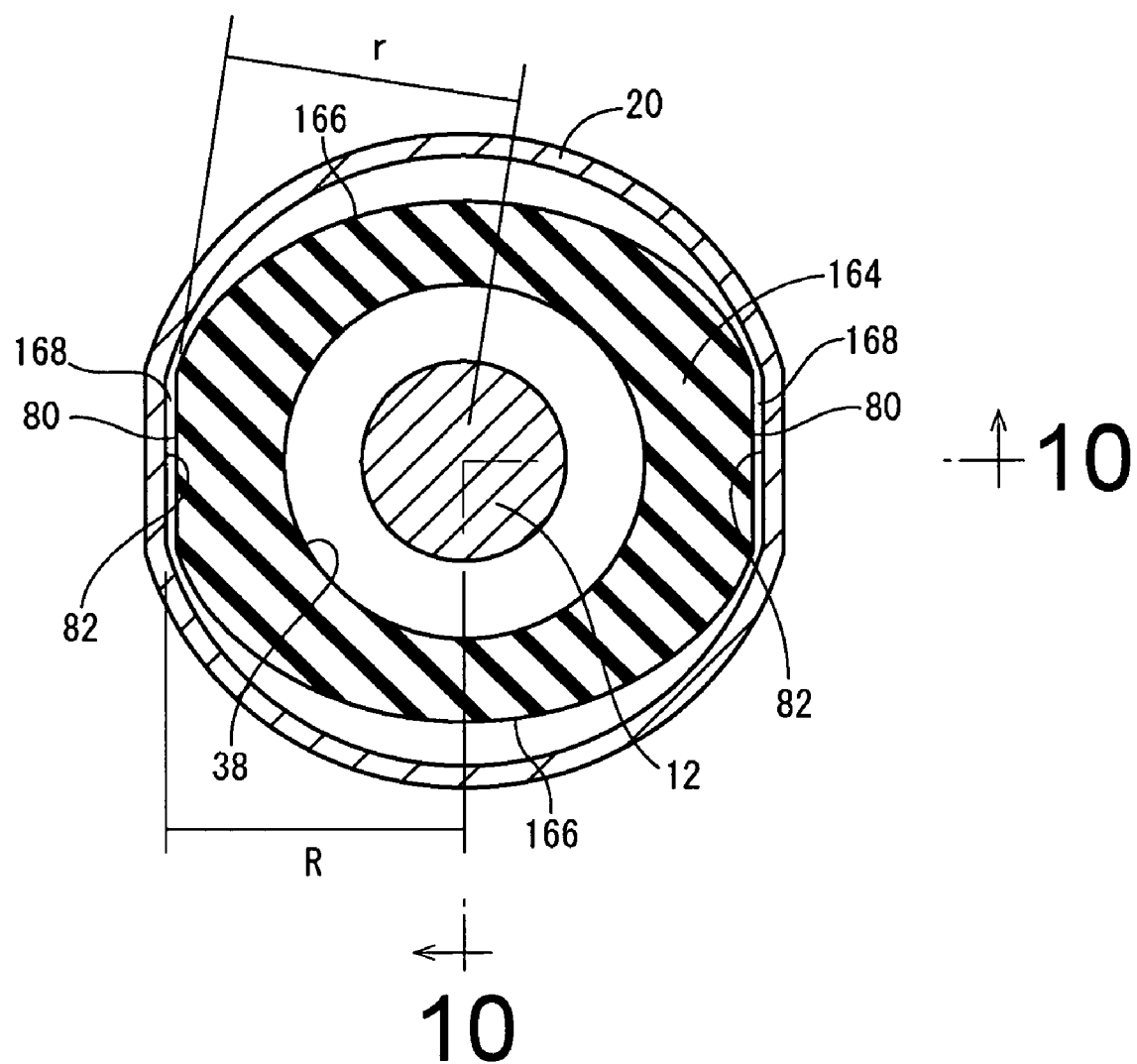
FIG. 11 is a transverse cross sectional view of the engine mount of FIG. 10, taken along line 11-11 of FIG. 10.

FIGS. 10 and 11 depict an automotive engine mount 162 as a fourth embodiment of the invention. This automotive engine mount 162 of the embodiment is of construction substantially similar to that of the engine mount 10 according to the first embodiment. In the following description, the same reference numerals as used in the first embodiment are used for identifying structurally and functionally corresponding elements, to omit redundant explanation for these elements.

In the engine mount 162 according to this embodiment, a rebound stopper rubber 164 serving as a cushioning rubber is pressed against the outer bracket 20 in the axial direction, while being spaced away from the outer bracket 20 in the axis perpendicular direction all the way around its circumference.

As shown in FIGS. 10 and 11, the rebound stopper rubber 164 is substantially the same in shape as the rebound stopper rubber 34 of the first embodiment overall, i.e., has a generally elliptical shape in plan view. A pair of flat faces are formed on the side faces of the rebound stopper rubber 164 at either side in the major axis direction. These flat faces extend in the axial direction, while being parallel to each other with a given width dimension in the circumferential direction. By means of these flat faces there is formed the pair of abutting faces 80. That is, the rebound stopper rubber 164 has an elliptical shape overall, with the flat faces in a diametrically opposed arrangement extending parallel to one another in the circumferential direction. As shown in FIGS. 10 and 11, the outer circumferential face of the rebound stopper rubber 164 includes elliptical shaped bowed faces (portions except the pair of abutting faces 80) at either side in the minor axis direction (hereinafter referred to as "bowed outer circumferential faces 166").

As will be understood from FIG. 11, the rebound stopper rubber 164 has an outside diameter dimension in the direction in which the pair of abutting faces 80 are opposed to each other, which is smaller than the distance between the pair of abutted faces 82 of the outer bracket 20. No press fit ridge 84 is formed unlike the first embodiment of the present invention.

Like in the first embodiment, the first integral vulcanization molded component 36 equipped with the rebound rubber stopper 164 is disposed coaxially with and press fit into the outer bracket 20. With this assembly state, the pair of abutting faces 80 formed on the rebound stopper rubber 164 are positioned in the circumferential direction relative to the pair of abutted faces 82 formed on the inner circumferential face of the outer bracket 20. The rebound stopper rubber 164 of generally elliptical shape is spaced away from the outer bracket 20 of generally cylindrical shape in the minor axis direction of the rebound stopper rubber 164. Also, a given gap 168 is formed between the pair of abutting faces 80 opposed in the major axis direction of the rebound stopper rubber 164 and the pair of abutted faces 82, whereby the rebound stopper rubber 164 is spaced away from the outer bracket 20 all the way around its circumference.

In FIG. 11, "r" represents the largest radius dimension of the rebound stopper rubber 164 (i.e. the radius dimension measured at a boundary between the abutting face 80 and the bowed outer circumferential face 166), and "R" represents the smallest radius dimension of the outer bracket 20 (i.e. a distance between the center of the bracket 20 and the abutted face 82). These dimensions meet the following inequality: r>R. With this arrangement, when the rebound stopper rubber 164 and the outer bracket 20 rotate relative to each other by a given amount, the boundary portions between the abutting faces 80 of the rebound stopper rubber 164 and the bowed outer circumferential faces 166 (i.e. circumferential edges of the abutting faces 80) come into abutment against the abutted faces 82 of the outer bracket 20, thereby suppressing the rotation of the rebound stopper rubber 164. Namely, a first rotation preventing mechanism for preventing relative rotation of the first mounting member 12 and the outer bracket 20 is provided by means of interference (abutment) between the abutting faces 80 and the abutted faces 82, which are formed as flat faces in a diametrically opposed arrangement on the rebound stopper rubber 164 and the outer bracket 20.

Figure 12:
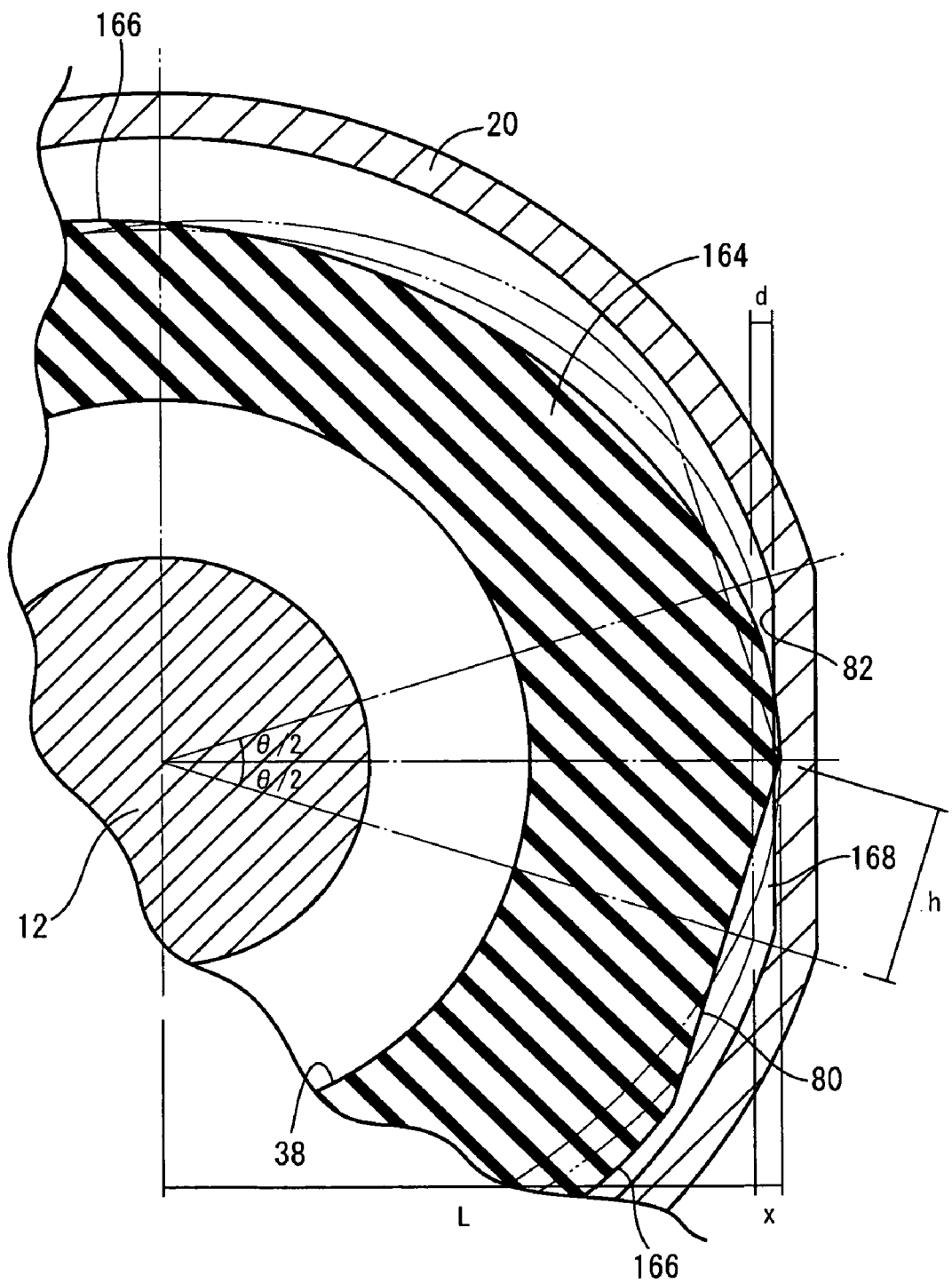
FIG. 12 is a view for explaining condition for an abutment between an abutting surface and an abutted surface in the engine mount of FIG. 10.

FIG. 12 shows the arrangement for abutment of the rebound stopper rubber 164 against the outer bracket 20. Namely, the rebound stopper rubber 164 and the outer bracket 20 are designed to meet the following equation 1, where "θ" is the rotation angle about the rotation center of the rebound stopper rubber 164 when a projection length of the rebound stopper rubber 164 toward the gap 168 is maximized; "L" is the distance from the center axis of the mount and the one abutting face 80; "2h" is the width dimension of the abutting face 80 in the circumferential direction; and "d" is the gap between the abutting face 80 and the abutted face 82:

$$\sin(\theta/2) < h/(d+L) \qquad \text{Equation 1}$$

With this arrangement, the rebound stopper rubber 164 rotate relative to the outer bracket 20 by an angle of not greater than θ/2, whereby the abutting face 80 comes into abutment against the abutted face 82.

Figure 13:
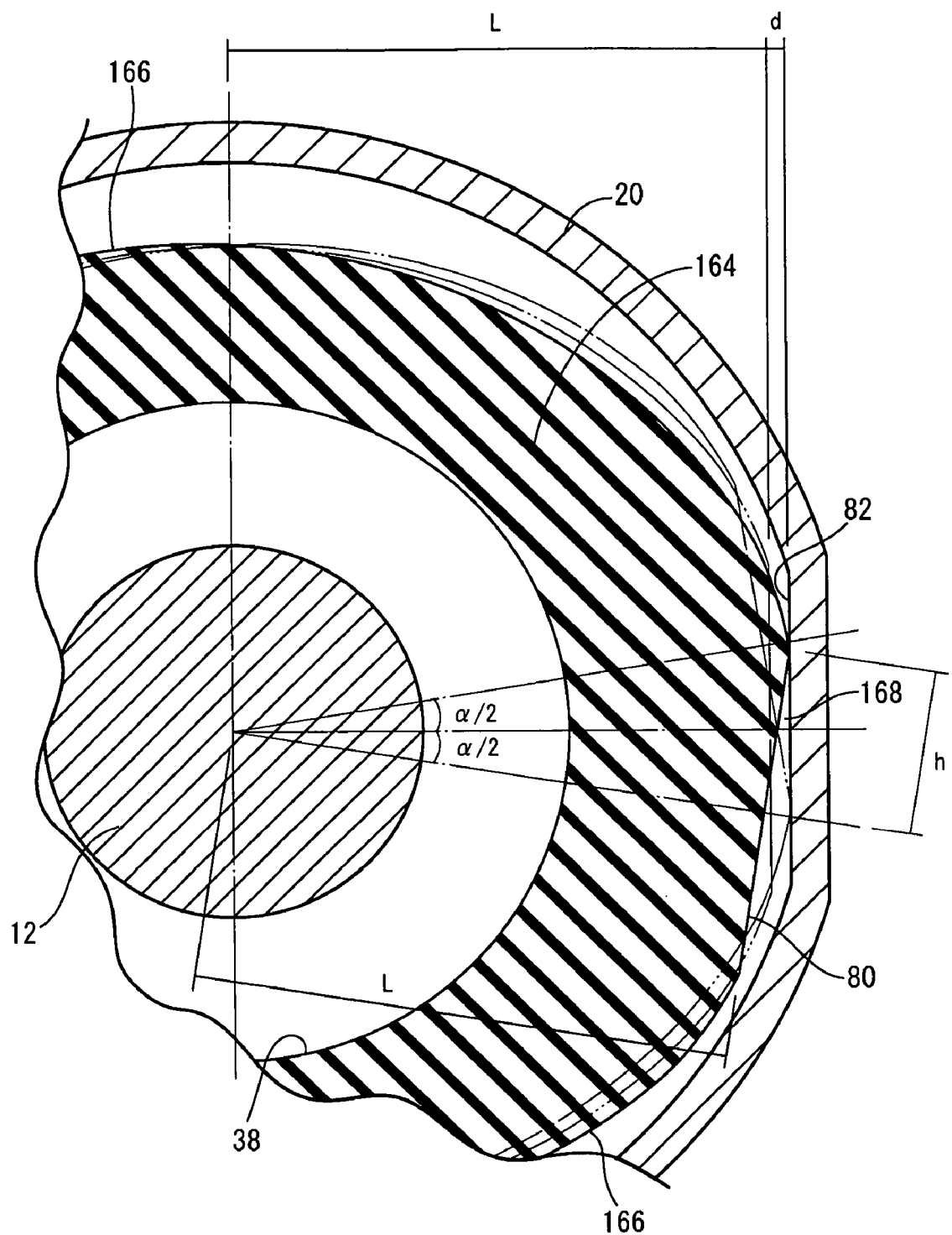
FIG. 13 is a view for explaining condition for an abutment between an abutting surface and an abutted surface in the engine mount of FIG. 10 by a given amount of relative rotation.

Alternatively, FIG. 13 shows the arrangement where the permissible amount of relative rotation of the rebound stopper rubber 164 against the outer bracket 20 is set to the specific rotation angle: α. Namely, the arrangement is made for bringing the abutting face 80 in its initial position into an abutment position against the abutted face 82 as a result of relative rotation of the rebound stopper rubber 164 relative to the outer bracket 20 by a rotation angle of α/2. In this arrangement, the values in h, L, and d will meet the following Equation 2:

$$\{(L\tan(\alpha/2)/\sin(\alpha/2))-L\}+\{(h-L\tan(\alpha/2))\sin(\alpha/2)\}=d \qquad \text{Equation 2}$$

With this arrangement, the rebound stopper rubber 164 can be designed so that the abutting face 80 comes into abutment against the abutted face 82 when the rebound rubber stopper 164 rotate relative to the outer bracket 20 from its initial position by a rotation angle of α/2. It should be appreciated that values in the equation 2 may be adjusted with the elastic deformation of the rebound stopper rubber 164 formed of a rubber elastic body, so that a rotation preventing mechanism is effectively realized by means of abutment between the faces 80 and 82, and the rotation of the rebound stopper rubber 164 can be checked with high precision.

The rotation angle a of the rebound stopper rubber 164 in the predetermined direction may be suitably determined depending on a kind of vehicle to which the engine mount 162 is installed. Preferably, the rotation angle a is not greater than 10° ($\alpha \leq 10°$), more preferably, not greater than 5° ($\alpha \leq 5°$). By setting the rotation angle a to this preferred range, the first mounting member 12 and the second mounting member 14 can be positioned to each other in the circumferential direction with sufficient precision, leading to sufficient improvements such as facility of assembly and the like, which will be described hereinbelow.

In this embodiment, the distance d (size of the gap 168) between the abutting face 80 and the abutted face 82 opposed to each other is sufficiently small. Preferably, the distance d is held within a range of 0.1 mm$\leq$d$\leq$1.5 mm, more preferably within a range of 0.3 mm$\leq$d$\leq$1.0 mm. By setting the distance d of the gap 168 to this preferred range, the relative rotation between the rebound stopper rubber 164 and the outer bracket 20 is effectively suppressed.

In the engine mount 162 constructed in accordance with this embodiment as well, advantages generally analogous to those in the first embodiment described previously can be achieved. More specifically, the abutment of the abutting faces 80 of the rebound stopper rubber 164 against the abutted faces 82 of the outer bracket 20 permits a precise positioning between the first and second mounting members 12, 14 in the circumferential direction, thereby permitting readily mounting of the engine mount 162 to the vehicle.

Additionally, with the state where the first and second mounting members 12, 14 are positioned in the circumferential direction, the rebound stopper rubber 164 is spaced away from the outer bracket 20 all around its circumference. When the first mounting member 12 rotates relative to the second mounting member 14, the rebound stopper rubber 164 comes into abutment against the inner circumferential face of the outer bracket 20, thereby preventing relative rotation between the first and second mounting members 12, 14. Namely, the abutting contact between the rebound stopper rubber 164 (the abutting faces 80) and the outer bracket 20 (the abutted faces 82) permits a stable positioning between the first and second mounting members 12, 14, thereby effectively facilitating the assembly of the engine mount 162 to the vehicle. In addition, since the rebound stopper rubber 164 is spaced away from the outer bracket 20 over its entire circumference in its initial mounted state, the rebound stopper rubber 164 exhibit an improved durability in comparison with the case where the rebound stopper rubber 164 is pressed against the outer bracket 20 in the axis perpendicular direction.

Further, since the rebound stopper rubber 164 is spaced away from the outer bracket 20 over its entire circumference, the rebound stopper rubber 164 is free from the problem of cracking or the like, even if the rebound stopper rubber 164 is subjected to the input load in the diagonal or axis perpendicular direction. Thus, the first mounting member 12 and the second mounting member 14 can be positioned in the circumferential direction with stability for a long period of time.

Further, the outer circumferential face of the rebound stopper rubber 164 is composed of the bowed outer circumferential faces 166 and the flat abutting faces 80, which are contiguous with one another. This arrangement makes it possible for the rebound stopper rubber 164 to avoid or moderate stress concentration when the rebound stopper rubber 164 is forcedly pressed against the outer bracket 20 in the axis perpendicular direction, thereby further improving durability of the rebound stopper rubber 164.

While the present invention has been described in detail in its presently preferred embodiment, for illustrative purpose only, it is to be understood that the invention is by no means limited to the details of the illustrated embodiment, but may be otherwise embodied.

In the first to third embodiments discussed previously, in order to adjust the spring properties in the vehicle front-to-back direction and vehicle side-to-side direction, the rebound stopper rubber 34 is of generally oval shape in plan view and disposed abutting the outer bracket 20 in the direction of the major axis thereof while spaced apart from it in the direction of the minor axis thereof. The rebound stopper rubber 34 need not necessarily be of oval tube shape, and may instead be of thick walled, generally round tubular shape, with the outer circumferential face disposed in abutment with the inner circumferential face of the outer bracket 20 around its entire circumference.

While the rebound stopper rubber 34 is pressed against the outer bracket 20 in the axis perpendicular direction in its initial state, in the illustrated first to third embodiments, this arrangement is not essential to practice the present invention. In these first to third embodiments, the abutting faces 80 and the abutted faces 82 may be spaced away from one another, and the rebound stopper rubber 34 and the outer bracket 20 may be spaced away from each other around the entire circumference in its initial state, like in the fourth embodiment.

In the construction where the abutting faces 80 and the abutted faces 82 are spaced away from one another, the rebound stopper rubber 34 and the outer bracket 20 is not necessarily spaced away from each other over the entire circumference. Alternatively, the present invention may be embodied such that the abutting faces 80 and the abutted faces 82 are spaced away from one another, while the other parts of the rebound stopper rubber 34 (i.e. the bowed outer circumferential faces 166) and the inner circumferential face of the outer bracket 20 is held in abutting contact with each other.

The main rubber rotation check mechanism for relative positioning of the first mounting member 12 (88) and the main rubber elastic body 16 (92) in the circumferential direction is not always necessary. Specifically, where the main rubber elastic body is of symmetrical rotation body shape having generally unchanging shape around its entire circumference rather than being anisotropic, and relative rotation of the main rubber elastic body with respect to the first mounting member is not a problem, a main rubber rotation check mechanism would not be needed.

Figure 14:
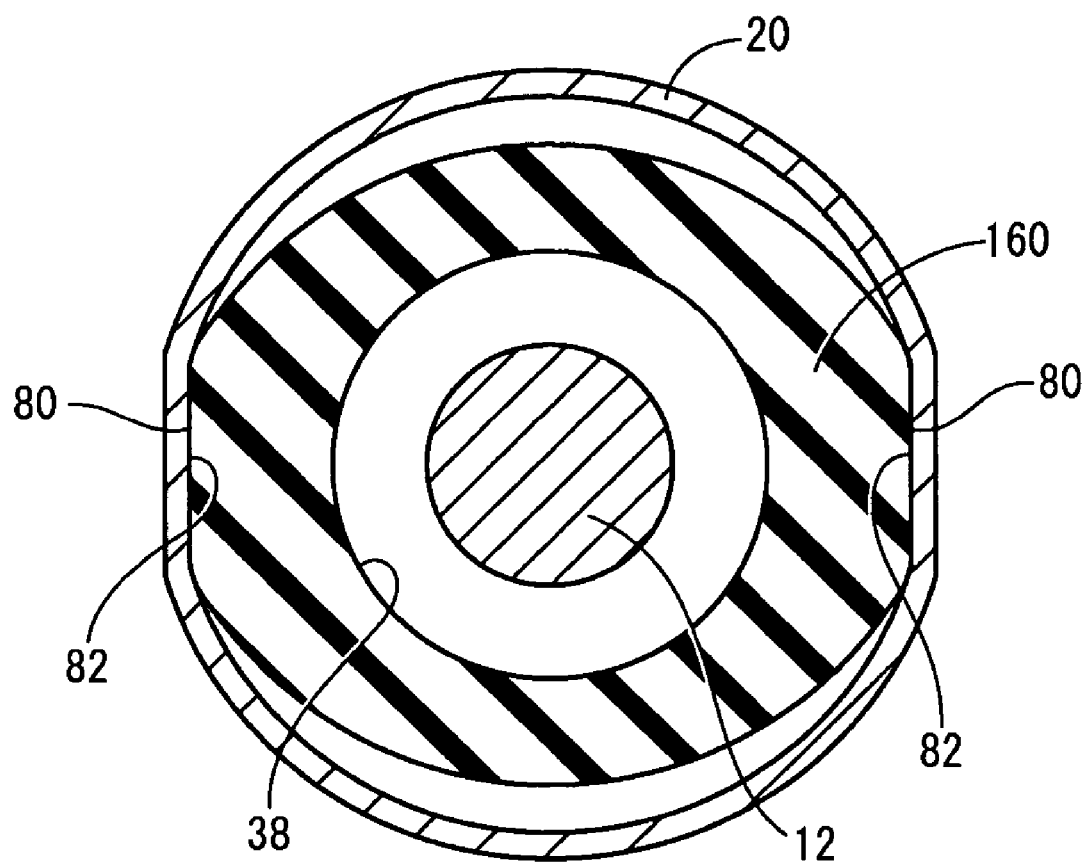
FIG. 14 is a transverse cross sectional view of another embodiment of the invention.

Also, the first to fourth embodiments discussed previously described an example in which press fit ridges 84 are formed projecting from the abutting faces 80, but such press fit ridges 84 are not always necessary; as depicted in FIG. 14, the abutting faces 80 formed on a rebound stopper rubber 160 devoid of press fit ridges may be placed in abutment against the abutted faces 82 over substantially the entire face. In the rebound stopper rubber 160 of this design, it is possible to effectively attain pushing force of the abutting faces 80 against the abutted faces 82, and to more advantageously prevent relative rotation of the first mounting member 12 and the outer bracket 20.

Also, the ridge 43 formed on the flat abutting face 26 described in the first to fourth embodiments discussed previously is not always necessary. Nor is it necessary for it to be formed so as to end linearly along one axis in the axis perpendicular direction. Further, by forming the ridges 43 so as to correspond to the location of the communicating slot 60 formed at the small diameter end of the main rubber elastic body 16, it is possible to form ridges 43 that mate with all of the communicating slots 60 formed.

While it is preferable to provide a pressure receiving fitting 48 affixed to the main rubber elastic body 16 (92) in order to attain improved durability of the main rubber elastic body 16 (92), this element is not always necessary.

It is also to be understood that the present invention may be embodied with various changes, modifications and improvements which may occur to those skilled in the art, without departing from the spirit and scope of the invention.

What is claimed is:

1. A vibration damping device for connecting two components in a vibration damping fashion, comprising:
 a main rubber elastic body of generally frustoconical shape overall;
 a first mounting member adapted to be fixed to one of the two components, and being of independent separate structure from the main rubber body, and being superimposed on a small diameter end face of the main rubber elastic body while being movable away therefrom;
 a second mounting member adapted to be fixed to an other one of the two components, and being fixed to an outer circumferential face of a large diameter end of the main rubber elastic body;
 a rebound abutting portion of flange shape integrally formed on an outside peripheral portion of the first mounting member;

a tubular bracket fastened fitting externally about the second mounting member and axially extending toward the first mounting member so as to provide a mating tube portion at an axial distal end portion thereof;

a stopper abutting portion formed at an axial distal end of the tubular bracket and extending inwardly in an axis perpendicular direction, the stopper abutting portion being situated facing and spaced apart axially outward with respect to the rebound abutting portion;

a cushioning rubber disposed on the rebound abutting portion so as to constitute a rebound stopper mechanism for limiting relative displacement in a moving away direction in an axial direction between the first mounting member and the second mounting member on the basis of cushion-wise abutment of the rebound abutting portion and the stopper abutting portion via the cushioning rubber;

a pair of first abutting faces for positioning purposes, being formed at portions situated to either side in a first axis perpendicular direction of an outer circumferential face of the cushioning rubber, in a diametrically opposed arrangement extending parallel to each other in a circumferential direction;

a pair of first abutted faces for positioning purposes, being formed at portions situated to either side in the first axis perpendicular direction of an inner circumferential face of the mating tube portion in a diametrically opposed arrangement extending parallel to each other in a circumferential direction, wherein with the pair of first abutting faces of the cushioning rubber aligned in the circumferential direction with respect to the pair of first abutted faces of the mating tube portion, the cushioning rubber is housed within the tubular bracket, with an axial distal end face of the cushioning rubber being pushed in the axial direction against the rebound abutting portion on the basis of the elasticity of the main rubber elastic body, and wherein a first rotation preventing mechanism for preventing rotation of the first mounting member about a center axis of the tubular bracket by means of abutting contact of the pair of first abutting faces of the cushioning rubber against the pair of first abutted faces of the mating tube portion.

2. A vibration damping device according to claim 1, wherein with the cushioning rubber housed within the tubular bracket with the abutting faces of the cushioning rubber and the abutted faces of the tubular bracket aligned in the circumferential direction, the pair of first abutting faces of the cushioning rubber are opposed to the pair of first abutted faces of the tubular bracket with a given gap therebetween, and the cushioning rubber are spaced away from the tubular bracket around an entire circumference thereof.

3. A vibration damping device according to claim 1, wherein with the cushioning rubber housed within the tubular bracket with the abutting faces of the cushioning rubber and the abutted faces of the tubular bracket aligned in the circumferential direction, the pair of first abutting faces of the cushioning rubber are pressed against the pair of first abutted faces of the tubular bracket on the basis of elasticity of the main rubber elastic body in the first axis perpendicular direction.

4. A vibration damping device according to claim 3, wherein pressure lips that project from each of the pair of abutting faces are integrally formed with the cushioning rubber in at least two circumferential end portions of each of the abutting faces; with the pressure lips being pressed in a compressed state against the pair of abutted faces.

5. A vibration damping device according to claim 1, further comprising:

a stopper rubber projecting in a direction of juxtaposition of the first mounting member and the main rubber elastic body, and formed on one of the first mounting member and the main rubber elastic body;

a mating recess opening onto a superimposed face of the first mounting member and the main rubber elastic body, and formed on an other of the first mounting member and the main rubber elastic body;

a pair of second abutting faces in a diametrically opposed arrangement extending parallel to one another in the circumferential direction, which are formed at portions situated to either side of an outer circumferential face of the stopper rubber in the first axis perpendicular direction; and a pair of second abutted faces in a diametrically opposed arrangement extending parallel to one another in the circumferential direction, which are formed at portions situated to either side of an inner circumferential face of the mating recess in the first axis perpendicular direction, wherein with the pair of second abutting faces aligned in the circumferential direction with respect to the pair of second abutted faces, the stopper rubber mates with the mating recess so as to provide a second rotation preventing mechanism for preventing rotation about the center axis of the main rubber elastic body with respect to the first mounting member.

6. A vibration damping device according to claim 5, wherein a gap is formed between the outer circumferential face of the stopper rubber and the inner circumferential face of the mating recess.

7. A vibration damping device according to claim 5, wherein a projecting length dimension of the stopper rubber is greater than a depth dimension of the mating recess.

8. A vibration damping device according to claim 7, wherein a slot is formed on a projecting distal end face of the stopper rubber, with edge portions of the slot opening onto a peripheral wall face of the stopper rubber.

9. A vibration damping device according to claim 5, wherein a peripheral wall face of at least a projecting distal end portion in the stopper rubber constitutes a tapering guide face composed of a sloping face.

10. A vibration damping device according to claim 1, further comprising a retainer member vulcanization bonded to a small diameter end of the main rubber elastic body.

11. A vibration damping device according to claim 10, wherein the retainer member is of generally cup shape opening onto the small diameter end face of the main rubber elastic body, and a pressure receiving flange of flange form is formed extending outward in the axis perpendicular direction at a rim of a mouth of the retainer member.

12. A vibration damping device according to claim 5, further comprising a retainer member vulcanization bonded to a small diameter end of the main rubber elastic body, wherein the retainer member is of generally cup shape opening onto the small diameter end of the main rubber elastic body, and a pressure receiving flange of flange form is formed extending outward in the axis perpendicular direction at a rim of a mouth of the retainer member, and wherein the mating recess is formed by a recess on an inside of the retainer member.

13. A vibration damping device according to claim 12, wherein an inside face rubber layer is formed so as to cover an entire inside face of the retainer member.

* * * * *